United States Patent
Zhang et al.

(10) Patent No.: US 11,112,584 B2
(45) Date of Patent: Sep. 7, 2021

(54) IMAGING LENS ASSEMBLY

(71) Applicant: Zhejiang Sunny Optical Co., Ltd, Zhejiang Province (CN)

(72) Inventors: Kaiyuan Zhang, Ningbo (CN); Lin Yang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 0 days.

(21) Appl. No.: 16/076,284

(22) PCT Filed: Nov. 17, 2017

(86) PCT No.: PCT/CN2017/111539
§ 371 (c)(1),
(2) Date: Aug. 7, 2018

(87) PCT Pub. No.: WO2018/223616
PCT Pub. Date: Dec. 13, 2018

(65) Prior Publication Data
US 2021/0048627 A1 Feb. 18, 2021

(30) Foreign Application Priority Data

Jun. 5, 2017 (CN) .......................... 201710414137.5
Jun. 5, 2017 (CN) .......................... 201720642397.3

(51) Int. Cl.
G02B 13/00 (2006.01)
G02B 9/62 (2006.01)

(52) U.S. Cl.
CPC ........... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS

2016/0124191 A1* 5/2016 Hashimoto ........ G02B 13/0045
359/708

* cited by examiner

*Primary Examiner* — Mohammed A Hasan
(74) *Attorney, Agent, or Firm* — Hauptman Ham, LLP

(57) ABSTRACT

The present disclosure discloses an imaging lens assembly having a total effective focal length f. The imaging lens assembly includes sequentially a first lens, a second lens, a third lens, a fourth lens, a fifth lens and a sixth lens from an object side to an image side along an optical axis. The first lens has a positive refractive power, and an object-side surface of the first lens is a convex surface; the second lens has a negative refractive power; and the third lens, the fourth lens, the fifth lens and the sixth lens each have a positive refractive power or a negative refractive power. A distance TTL from the object-side surface of the first lens to an image plane of the imaging lens assembly on the optical axis and the total effective focal length f of the imaging lens assembly satisfy: TTL/f≤1.05.

19 Claims, 12 Drawing Sheets

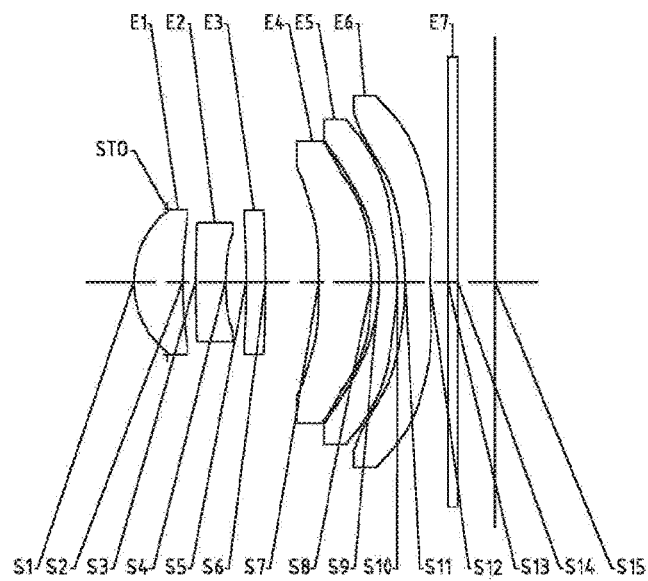
Fig. 9
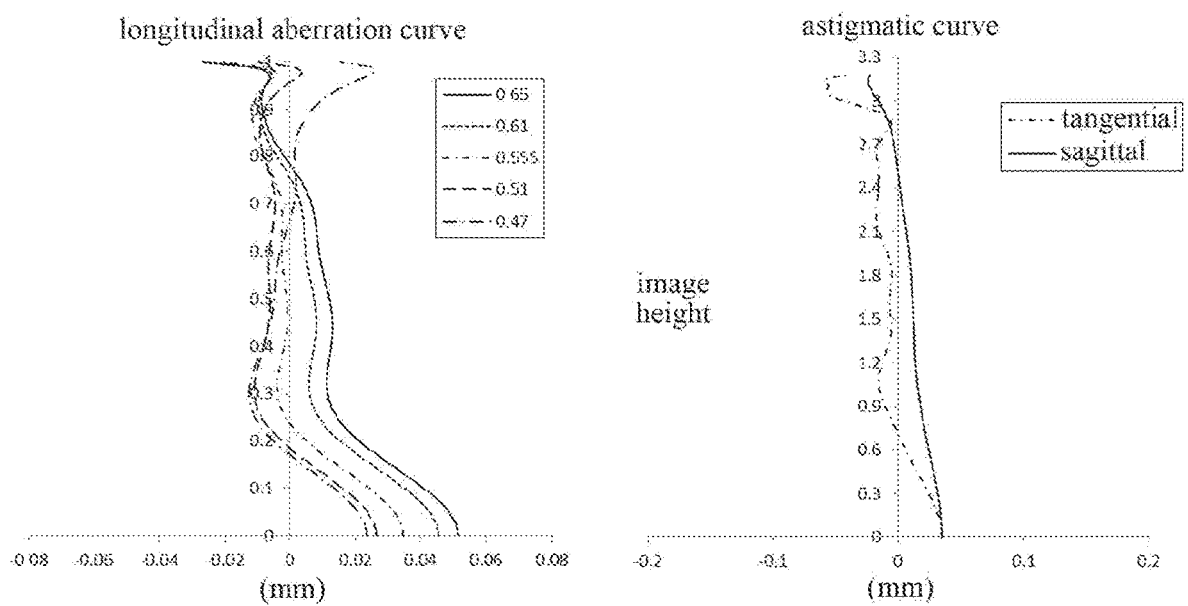
Fig. 10A                        Fig. 10B

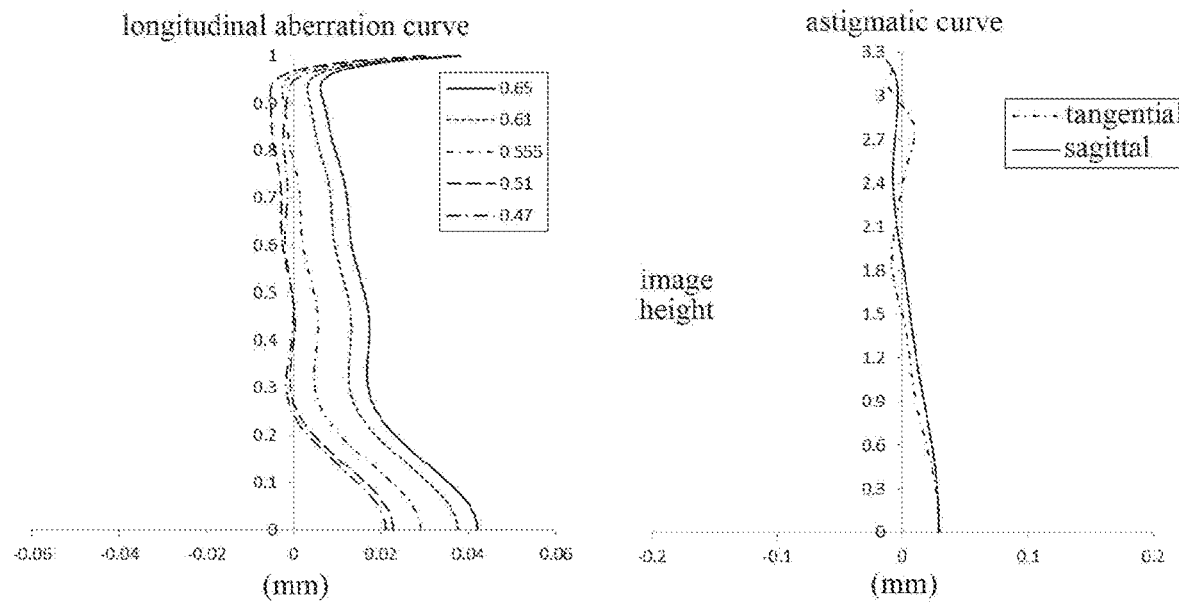
Fig. 12A                    Fig. 12B
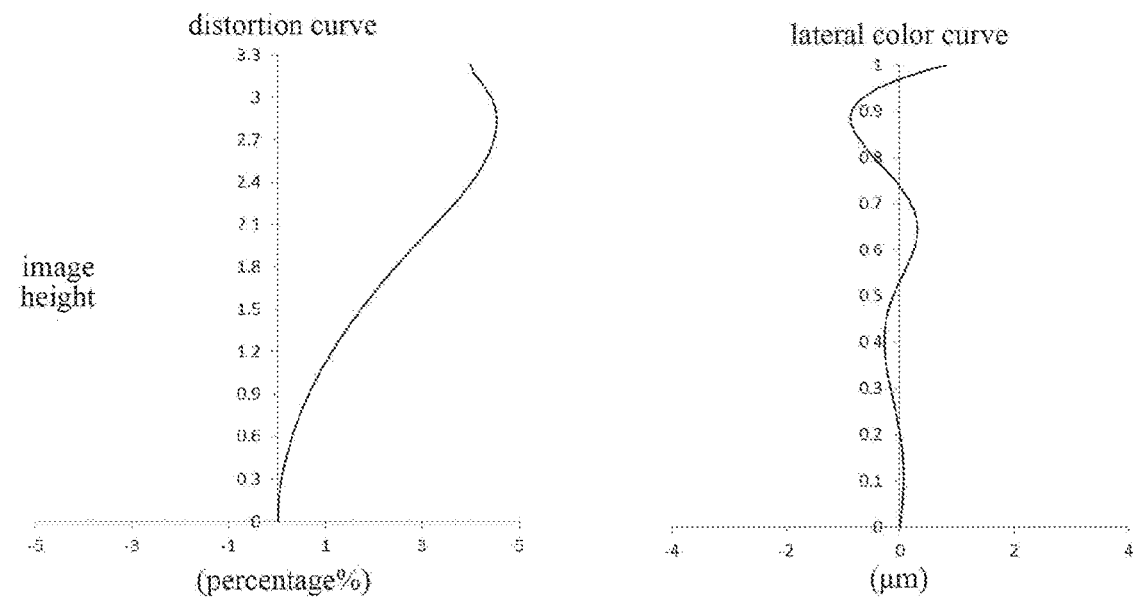
Fig. 12C                    Fig. 12D

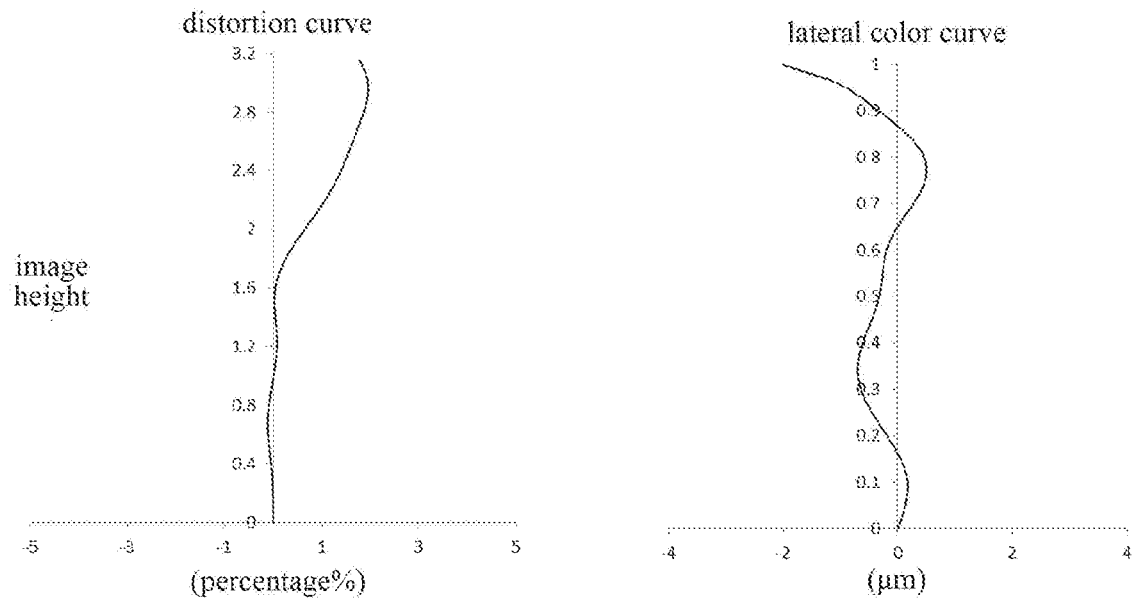
Fig. 14C
Fig. 14D
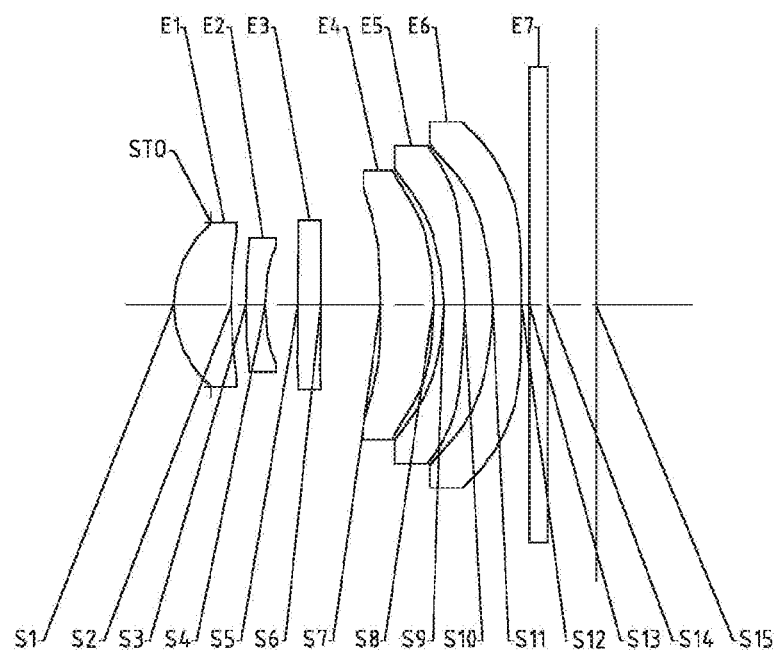
Fig. 15

IMAGING LENS ASSEMBLY

CROSS-REFERENCE TO RELATED APPLICATIONS

This application is a U.S. National Stage Application under 35 USC § 371 of PCT/CN2017/111539, filed Nov. 17, 2017, which claims priorities and rights from Chinese Patent Application No. 201710414137.5, filed with the State Intellectual Property Office of China (SIPO) on Jun. 5, 2017, and Chinese Patent Application No. 201720642397.3 filed with the SIPO on Jun. 5, 2017, the disclosures of which are hereby incorporated by reference in their entireties.

TECHNICAL FIELD

The present invention relates to an imaging lens assembly, and more specifically to an imaging lens assembly including six lenses.

BACKGROUND

In recent years, with the improvement of performances and the reduction in sizes of elements such as an often used photosensitive element CCD (charge-coupled device) or CMOS (complementary metal-oxide semiconductor), higher requirements on a high image quality and miniaturization of counterpart lens assemblies have been brought forward.

With the popularization of portable electronic products, requirements of people on the image quality of the portable electronic products having camera functions are gradually increasing.

In order to adapt to the trend towards lighter and thinner portable electronic products such as cellphones and tablet computers, a counterpart imaging lens assembly also needs to satisfy the miniaturization requirement. In order to meet the miniaturization requirement of the imaging lens assembly, it is usually necessary to reduce the number of lenses of the imaging lens assembly as much as possible. However, the lack of design freedom caused thereby will make the imaging lens assembly hard to satisfy market demands on the high imaging performance.

In addition, current mainstream imaging lens assemblies generally use a wide-angle optical system in order to obtain a wide viewing-angle image. However, it is not helpful to shoot a distant object, and cannot obtain a clear image at a distance, resulting in a poor user experience.

The dual-camera technology emerged to solve the above mentioned problems may obtain high angular resolution through a telephoto lens assembly, and then realize the enhancement of high frequency information through an image fusion technology. However, in the dual-camera technology, the design of the telephoto lens assembly is particularly important, and how to design the lens assembly to satisfy the telephoto and ultrathin characteristics at the same time is an urgent problem to be solved.

SUMMARY

The present invention provides an imaging lens assembly that may be applied to the portable electronic products and may solve or partially solve at least one of the above mentioned disadvantages in the existing technology.

An imaging lens assembly is provided according to an aspect of the present disclosure. The imaging lens assembly has a total effective focal length f, and includes sequentially a first lens, a second lens, a third lens, a fourth lens, a fifth lens and a sixth lens from an object side to an image side along an optical axis. The first lens may have a positive refractive power, and an object-side surface of the first lens is a convex surface. The second lens has a negative refractive power. The third lens, the fourth lens, the fifth lens and the sixth lens each have a positive refractive power or a negative refractive power. A distance TTL from the object-side surface of the first lens to an image plane of the imaging lens assembly on the optical axis and the total effective focal length f of the imaging lens assembly may satisfy: $TTL/f \leq 1.05$.

An imaging lens assembly is provided according to another aspect of the present disclosure. The imaging lens assembly has a total effective focal length f, and includes sequentially a first lens, a second lens, a third lens, a fourth lens, a fifth lens and a sixth lens from an object side to an image side along an optical axis. The first lens may have a positive refractive power, and an object-side surface of the first lens is a convex surface. The second lens has a negative refractive power. The third lens, the fourth lens, the fifth lens and the sixth lens each have a positive refractive power or a negative refractive power. The total effective focal length f of the imaging lens assembly and an effective focal length f5 of the fifth lens may satisfy: $-2.0 < f/f5 < 1.0$.

An imaging lens assembly is provided according to another aspect of the present disclosure. The imaging lens assembly has a total effective focal length f, and includes sequentially a first lens, a second lens, a third lens, a fourth lens, a fifth lens and a sixth lens from an object side to an image side along an optical axis. The first lens may have a positive refractive power, and an object-side surface of the first lens is a convex surface. The second lens has a negative refractive power. The third lens, the fourth lens, the fifth lens and the sixth lens each have a positive refractive power or a negative refractive power. The total effective focal length f of the imaging lens assembly and a radius of curvature R10 of an image-side surface of the fifth lens may satisfy: $-2.0 < f/R10 < 0$.

In an implementation, the distance TTL from the object-side surface of the first lens to an image plane of the imaging lens assembly on the optical axis and ImgH, ImgH being half of a diagonal length of an effective pixel area on the image plane of the imaging lens assembly, may satisfy: $TTL/ImgH \leq 2.0$.

In an implementation, the total effective focal length f of the imaging lens assembly and an entrance pupil diameter EPD of the imaging lens assembly may satisfy: $f/EPD \leq 2.7$.

In an implementation, the total effective focal length f of the imaging lens assembly and a center thickness CT6 of the sixth lens on the optical axis may satisfy: $f/CT6 \geq 15$.

In an implementation, the center thickness CT6 of the sixth lens on the optical axis and an edge thickness ET6 of the sixth lens at a maximum radius may satisfy: $CT6/ET6 < 1.3$.

In an implementation, a center thickness CT4 of the fourth lens on the optical axis and the total effective focal length f of the imaging lens assembly may satisfy: $0 < CT4/f < 0.5$.

In an implementation, an air spacing T34 between the third lens and the fourth lens on the optical axis and the total effective focal length f of the imaging lens assembly may satisfy: $0 < T34/f < 0.2$.

In an implementation, an effective focal length f4 of the fourth lens and an effective focal length f3 of the third lens may satisfy: $0 < f4/f3 < 0.5$.

In an implementation, the total effective focal length f of the imaging lens assembly and an effective focal length f6 of the sixth lens may satisfy: $-2.0 < f/f6 < 0.5$.

In an implementation, a radius of curvature R1 of the object-side surface of the first lens and the total effective focal length f of the imaging lens assembly may satisfy: $0<R1/f<0.5$.

In an implementation, the radius of curvature R1 of the object-side surface of the first lens and a radius of curvature R2 of an image-side surface of the first lens may satisfy: $|R1/R2|<0.5$.

In the present disclosure, multiple lenses (e.g., six lenses) are used. By reasonably distributing the refractive powers, surface type of the lenses, center thicknesses of the lenses, and air spacing between the lenses on the optical axis of the imaging lens assembly, the imaging lens assembly achieves a telephoto effect while satisfying the miniaturization.

BRIEF DESCRIPTION OF THE DRAWINGS

By describing non-limiting implementations below in detail with reference to the accompanying drawings, other features, objectives and advantages of the present invention will be more apparent. In the accompanying drawings:

FIG. 9 illustrates a schematic structural diagram of an imaging lens assembly according to embodiment 5 of the present disclosure;

FIGS. 10A-10D respectively illustrate a longitudinal aberration curve, an astigmatic curve, a distortion curve and a lateral color curve of the imaging lens assembly according to embodiment 5;

FIGS. 12A-12D respectively illustrate a longitudinal aberration curve, an astigmatic curve, a distortion curve and a lateral color curve of the imaging lens assembly according to embodiment 6;

FIGS. 14A-14D respectively illustrate a longitudinal aberration curve, an astigmatic curve, a distortion curve and a lateral color curve of the imaging lens assembly according to embodiment 7;

FIG. 15 illustrates a schematic structural diagram of an imaging lens assembly according to embodiment 8 of the present disclosure.

DETAILED DESCRIPTION OF EMBODIMENTS

Figure 1:
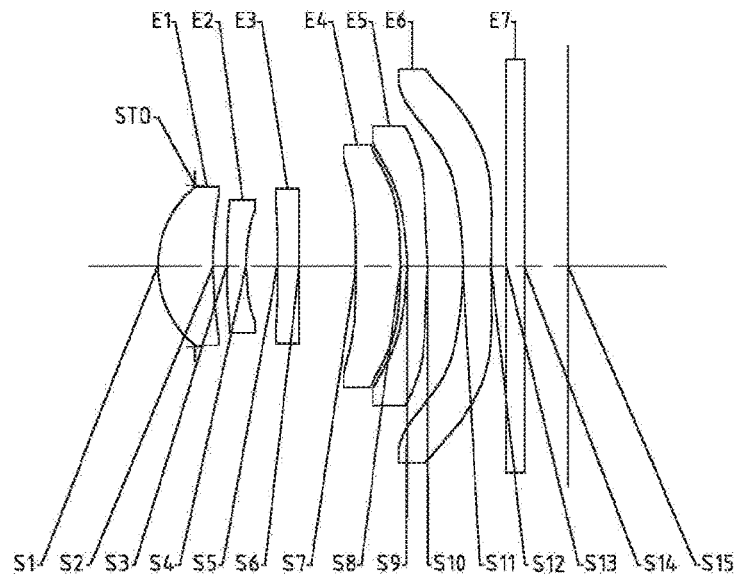
FIG. 1 illustrates a schematic structural diagram of an imaging lens assembly according to embodiment 1 of the present disclosure.

Various aspects of the present disclosure will be described in more detail with reference to the accompanying drawings, so as to better understand the present disclosure. It should be appreciated that the detailed description is merely an explanation for exemplary implementations of the present disclosure, rather than a limitation to the scope of the present disclosure in any way. The same reference numerals designate the same elements throughout this specification. The expression "and/or" includes any and all combinations of one or more of the associated listed items.

It should be noted that, in the specification, expressions, such as "first," "second" and "third" are merely used to distinguish one feature from another rather than represent any limitations to the feature. Thus, a first lens discussed below may also be termed a second lens or a third lens without departing from the teachings of the present disclosure.

In the accompanying drawings, for the convenience of description, the thicknesses, dimensions and shapes of lenses have been slightly exaggerated. Specifically, shapes of spherical surfaces or aspheric surfaces shown in the accompanying drawings are illustrated by examples. That is, shapes of the spherical surfaces or the aspheric surfaces are not limited to the shapes of the spherical surfaces or the aspheric surfaces shown in the accompanying drawings. The accompanying drawings are merely examples, not strictly drawn to scale.

In the present disclosure, a paraxial area indicates an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface closest to an object in each lens is referred to as an object-side surface, and a surface closest to an image plane in each lens is referred to as an image-side surface.

It should be further understood that the terms "comprising," "including," "having" and variants thereof, when used in this specification, specify the presence of stated characteristics, elements and/or components, but do not exclude the presence or addition of one or more other characteristics, elements, components and/or combinations thereof. In addition, expressions, such as "at least one of," when preceding a list of elements, modify the entire list of elements rather than an individual element in the list. Further, the use of "may," when describing implementations of the present disclosure, relates to "one or more implementations of the present disclosure." Also, the term "exemplary" is intended to refer to an example or an illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in some embodiments may be combined with each other on a non-conflict basis. The present disclosure will be described below in detail with reference to the accompanying drawings and in combination with the embodiments.

Characteristics, principles and other aspects of the present disclosure will be described below in detail.

An imaging lens assembly according to exemplary implementations of the present disclosure includes, for example, six lenses (i.e., a first lens, a second lens, a third lens, a fourth lens, a fifth lens and a sixth lens) having refractive powers. These six lenses are arranged in sequence from an object side to an image side along an optical axis.

In the exemplary implementations, the first lens may have a positive refractive power, and an object-side surface of the first lens may be a convex surface. The second lens may have a negative refractive power. The third to sixth lenses may each have a positive refractive power or a negative refractive power. The reasonable distribution of the refractive powers is helpful to realize a distribution of low-order aberrations and a good optical image quality of the system, and is helpful to achieve an ultrathin function.

In the application, the first lens provides main positive refractive power required by the entire optical system, and most of the positive refractive power is concentrated on the object-side surface of the first lens. By restricting a radius of curvature of the object-side surface of the first lens to a reasonable range, the refractive power of the entire optical system may be ensured, and a large number of spherical aberrations will not be generated due to a curvature too severe of the object surface of the first lens, thereby causing the improvement of the aberration contribution rates of the mirror surfaces in the rear system. For example, the radius of curvature R1 of the object-side surface of the first lens and a total effective focal length f of the imaging lens assembly may satisfy: $0<R1/f<0.5$, and more specifically, R1 and f may further satisfy: $0.24<R1/f\leq0.32$.

In addition, a relative range of a radius of curvature of an image-side surface and the radius of curvature of the object-side surface of the first lens may further be reasonably controlled, to effectively control a comatic aberration of each field-of-view of the optical system, thereby acquiring a good image quality. The radius of curvature R1 of the object-side surface of the first lens and the radius of curvature R2 of the image-side surface of the first lens may satisfy: $|R1/R2|<0.5$, and more specifically, R1 and R2 may further satisfy: $0.02\leq|R1/R2|\leq0.26$.

In the exemplary implementations, by reasonably distributing the refractive powers of the fourth lens and the third lens, the correction for relevant aberrations of the field-of-view may be effectively realized, which is helpful to achieve a good image quality of an edge field-of-view of the optical system. For example, an effective focal length f4 of the fourth lens and an effective focal length f3 of the third lens may satisfy: $0<f4/f3<0.5$, and more specifically, f4 and f3 may further satisfy: $0.01\leq f4/f3\leq0.37$.

In the exemplary implementations, by controlling the refractive power of the sixth lens to a reasonable range, the field curvature and the distortion of the optical system can be effectively controlled, so as to acquire the good image quality at the edge field-of-view of the optical system. For example, the total effective focal length f of the imaging lens assembly and an effective focal length f6 of the sixth lens may satisfy: $-2.0<f/f6<0.5$, and more specifically, f and f6 may further satisfy: $-1.63\leq f/f6\leq0.12$.

The total effective focal length f of the imaging lens assembly and an effective focal length f5 of the fifth lens may satisfy: $-2.0<f/f5<1.0$, and more specifically, f and f5 may further satisfy: $-1.61\leq f/f5\leq0.75$. By controlling the effective refractive power of the fifth lens, the aberration contribution rate of the fifth lens is in a reasonable range, to effectively balance the amount of the astigmatism of the system, so that the system acquires the good image quality.

The total effective focal length f of the imaging lens assembly and a radius of curvature R10 of an image-side surface of the fifth lens may satisfy: $-2.0<f/R10<0$, and more specifically, f and R10 may further satisfy: $-1.65\leq f/R10\leq-0.63$. By reasonably controlling a direction and a size of the radius of curvature of the image-side surface of the fifth lens, the fifth lens possesses a good capability to balance spherical aberrations, so as to acquire a good axial image quality.

In the application, center thicknesses of the lenses and spacing distances between the lenses may be reasonably distributed. A center thickness CT4 of the fourth lens on the optical axis and the total effective focal length f of the imaging lens assembly may satisfy: $0<CT4/f<0.5$, and more specifically, CT4 and f may further satisfy: $0.04\leq CT4/f\leq0.14$. By restricting the ratio of the center thickness of the fourth lens to the total effective focal length of the optical system, the field curvature and the distortion of the optical system can be effectively corrected, so that the optical system acquires a good image quality at the full field-of-view.

In the exemplary implementations, the center thickness CT6 of the sixth lens on the optical axis and the total effective focal length f of the imaging lens assembly may satisfy: $f/CT6\geq15$, and more specifically, CT6 and f may further satisfy: $15.27\leq f/CT6\leq30.41$. Moreover, the center thickness CT6 of the sixth lens on the optical axis and an edge thickness ET6 of the sixth lens at a maximum radius may satisfy: $CT6/ET6<1.3$, and more specifically, CT6 and ET6 may further satisfy: $0.34\leq CT6/ET6\leq1.21$. By restricting the ratio of the center thickness of the sixth lens to the edge thickness of the sixth lens, the sixth lens having a large asphericity can possess good forming characteristics.

An air spacing T34 between the third lens and the fourth lens on the optical axis and the total effective focal length f of the imaging lens assembly may satisfy: $0<T34/f<0.2$, and more specifically, T34 and f may further satisfy: $0.05\leq T34/f\leq0.14$. By controlling the spacing distance between the third lens and the fourth lens, a combined refractive power of a first optical lens assembly formed by the first lens, the second lens and the third lens and a combined refractive power of a second optical lens assembly formed by the fourth lens, the fifth lens and the sixth lens can be effectively adjusted, so that the first optical lens assembly and the second optical lens assembly respectively obtain reasonable combined refractive powers.

In the exemplary implementations, by restricting a ratio of a total length of the lens assembly to an image height, requirements on a large image plane and high pixels of the imaging lens assembly are realized. For example, an axial distance TTL from the object-side surface of the first lens to the image plane of the imaging lens assembly and ImgH, ImgH being half of a diagonal length of an effective pixel area on the image plane of the imaging lens assembly, may satisfy: TTL/ImgH≤2.0, and more specifically, TTL and ImgH may further satisfy: 1.48<TTL/ImgH≤2.00.

The axial distance TTL from the object-side surface of the first lens to the image plane of the imaging lens assembly and the total effective focal length f of the imaging lens assembly may satisfy: TTL/f≤1.05, and more specifically, TTL and f may further satisfy: 0.92≤TTL/f≤1.05. When parameters of the lens assembly satisfy the conditional formula TTL/f≤1.05, the total length of the optical system can be effectively controlled, so that the optical system can be applied to a terminal device such as a cellphone which has strict requirements on the size of the optical system.

The total effective focal length f of the imaging lens assembly and an entrance pupil diameter EPD of the imaging lens assembly may satisfy: f/EPD≤2.7, and more specifically, f and EPD may further satisfy: 2.47<f/EPD≤2.69. When the conditional formula f/EPD≤2.7 is satisfied, the lens assembly acquires a reasonable diffraction resolution, and further acquires a reasonable design and a true resolving power after the processing.

Alternatively, the imaging lens assembly of the present disclosure may further include an optical filter for correcting color deviations. The optical filter may be arranged, for example, between the sixth lens and the image plane. It should be understood by those skilled in the art that, the optical filter may be arranged at other positions according to requirements.

The imaging lens assembly according to the above implementations of the present disclosure may use multiple lenses (e.g., the six lenses described above). By reasonably distributing the refractive powers, surface types and center thicknesses of the lenses, the axial spacing distances between the lenses, and so on, the long focal length characteristic may be realized while the miniaturization of the lens assembly is ensured, and the resolution and the image quality of the lens assembly are improved, so that the imaging lens assembly is more conducive to the production and processing and may be applied to portable electronic products. In the implementations of the present disclosure, at least one of the mirror surfaces of the lenses is an aspheric mirror surface. An aspheric lens is characterized in that its curvature continuously changes from the lens center to the periphery. In contrast to a spherical lens having a constant curvature from the lens center to the periphery, the aspheric lens has a better radius-of-curvature characteristic, and has the advantages of improving the distortion aberration and the astigmatism aberration. The use of the aspheric lens can eliminate as much as possible the aberration that occurs during the imaging, thereby improving the image quality of the lens assembly.

However, it should be understood by those skilled in the art that, in a situation without departing from the technical solution claimed by the present disclosure, the number of lenses forming the imaging lens assembly may be changed, to obtain the various results and advantages described in the specification of the present disclosure. For instance, in the descriptions of the implementations, an imaging lens assembly having six lenses is described as an example, but the imaging lens assembly is not limited to include six lenses. If necessary, the imaging lens assembly may also include other numbers of lenses.

Specific embodiments applicable to the imaging lens assembly of the above implementations will be further described below with reference to the accompanying drawings.

Embodiment 1

An imaging lens assembly according to embodiment 1 of the present disclosure is described below with reference to FIGS. 1-2D. FIG. 1 illustrates a schematic structural diagram of the imaging lens assembly according to embodiment 1 of the present disclosure.

As shown in FIG. 1, the imaging lens assembly includes, along an optical axis, six lenses E1-E6 arranged in sequence from an object side to an image side. The first lens E1 has a positive refractive power, and an object-side surface S1 and an image-side surface S2 of the first lens are aspheric surfaces. The second lens E2 has a negative refractive power, and an object-side surface S3 and an image-side surface S4 of the second lens are aspheric surfaces. The third lens E3 has a positive refractive power, and an object-side surface S5 and an image-side surface S6 of the third lens are aspheric surfaces. The fourth lens E4 has a positive refractive power, and an object-side surface S7 and an image-side surface S8 of the fourth lens are aspheric surfaces. The fifth lens E5 has a negative refractive power, and an object-side surface S9 and an image-side surface S10 of the fifth lens are aspheric surfaces. The sixth lens E6 has a negative refractive power, and an object-side surface S11 and an image-side surface S12 of the sixth lens are aspheric surfaces. Alternatively, the imaging lens assembly may further include an optical filter E7 having an object-side surface S13 and an image-side surface S14. In the imaging lens assembly of this embodiment, a diaphragm STO for limiting light beams may also be arranged, for example, between the object side and the first lens E1, to improve the image quality. Light from an object sequentially passes through the surfaces S1 to S14 and finally forms an image on an image plane S15.

Table 1 shows the surface type, the radius of curvature, the thickness, the material and the conic coefficient of each lens of the imaging lens assembly in embodiment 1. The radius of curvature and the thickness are shown in millimeters (mm).

TABLE 1

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4411 | | | |
| S1 | aspheric | 1.2377 | 0.6562 | 1.55 | 56.1 | −6.0206 |
| S2 | aspheric | 4.8183 | 0.1637 | | | −23.4370 |
| S3 | aspheric | 9.6149 | 0.2265 | 1.67 | 20.4 | −29.9487 |
| S4 | aspheric | 2.6138 | 0.3706 | | | −0.4706 |
| S5 | aspheric | 22.1192 | 0.2600 | 1.55 | 56.1 | −98.3047 |
| S6 | aspheric | 23.0039 | 0.6711 | | | −10.6064 |

TABLE 1-continued

| surface number | surface type | radius of curvature | thickness | refractive index | abbe number | conic coefficient |
|---|---|---|---|---|---|---|
| S7 | aspheric | 6002.0270 | 0.5369 | 1.64 | 23.5 | 0.0000 |
| S8 | aspheric | −4.6663 | 0.0812 | | | 1.2840 |
| S9 | aspheric | −2.0132 | 0.2400 | 1.55 | 56.1 | −1.9217 |
| S10 | aspheric | −3.5332 | 0.4181 | | | −60.7766 |
| S11 | aspheric | −4.9715 | 0.3317 | 1.54 | 55.9 | −1.1944 |
| S12 | aspheric | 8.6693 | 0.1837 | | | −97.3478 |
| S13 | spherical | infinite | 0.2100 | 1.52 | 64.2 | |
| S14 | spherical | infinite | 0.5184 | | | |
| S15 | spherical | infinite | | | | |

Referring to Table 1, the radius of curvature R1 of the object-side surface S1 of the first lens E1 and the radius of curvature R2 of the image-side surface S2 of the first lens E1 satisfy: |R1/R2|=0.26.

In some embodiments, the lens assembly having six lenses is used as an example. By reasonably distributing the focal lengths and the surface types of the lenses and the spacing distances between the lenses, the resolution of the lens assembly is improved and the telephoto effect is achieved, while the miniaturization of the lens assembly is ensured. A surface type x of each aspheric surface is defined by the following formula:

$$x = \frac{ch^2}{1 + \sqrt{1-(1+k)c^2h^2}} + \Sigma A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (being given in Table 1 above); and Ai is the correction coefficient of the i-th order of the aspheric surface. Table 2 below shows the high-order coefficients $A_4$, $A_6$, $A_8$, $A_{10}$, $A_{12}$, $A_{14}$, $A_{16}$, $A_{18}$ and $A_{20}$ that can be applied to the aspheric mirror surfaces S1-S12 in embodiment 1.

TABLE 2

| surface number | A4 | A6 | A8 | A10 | A12 |
|---|---|---|---|---|---|
| S1 | 4.0477E−01 | −5.7538E−01 | 1.3127E+00 | −2.4792E+00 | 3.2759E+00 |
| S2 | −5.2103E−02 | 3.3678E−01 | −2.1998E+00 | 1.0956E+01 | −3.4257E+01 |
| S3 | −1.1657E−01 | 1.4050E−01 | 2.3603E+00 | −1.5637E+01 | 5.7094E+01 |
| S4 | −6.4442E−02 | 9.9864E−01 | −7.2025E+00 | 5.6292E+01 | −2.7866E+02 |
| S5 | −1.6336E−01 | −5.9277E−02 | 1.4509E+00 | −4.4438E+00 | 6.1286E+00 |
| S6 | −1.3458E−01 | 1.1225E−01 | 1.7645E−01 | −4.3058E−01 | 6.1902E−01 |
| S7 | −4.3402E−02 | −2.1373E−01 | 5.0167E−01 | −6.7581E−01 | 5.8021E−01 |
| S8 | 2.6467E−01 | −1.1184E+00 | 1.9704E+00 | −2.0376E+00 | 1.2858E+00 |
| S9 | 5.3815E−01 | −1.5388E+00 | 2.5163E+00 | −2.6097E+00 | 1.6978E+00 |
| S10 | 8.2404E−02 | 5.2643E−02 | −2.7335E−01 | 3.0120E−01 | −1.8208E−01 |
| S11 | −8.8549E−02 | 3.2276E−01 | −4.8703E−01 | 3.8071E−01 | −1.7921E−01 |
| S12 | −1.3874E−01 | 2.1392E−01 | −2.2905E−01 | 1.3765E−01 | −5.0129E−02 |

| surface number | A14 | A16 | A18 | A20 |
|---|---|---|---|---|
| S1 | −2.3473E+00 | 3.0341E−01 | 6.8636E−01 | −3.2470E−01 |
| S2 | 6.7225E+01 | −8.0688E+01 | 5.4113E+01 | −1.5556E+01 |
| S3 | −1.3133E+02 | 1.8559E+02 | −1.4698E+02 | 4.9861E+01 |
| S4 | 8.6160E+02 | −1.6188E+03 | 1.6935E+03 | −7.5617E+02 |
| S5 | 2.8965E+00 | −2.3248E+01 | 3.0447E+01 | −1.3426E+01 |
| S6 | −2.7562E−01 | −7.3897E−01 | 1.0431E+00 | −3.8872E−01 |
| S7 | −3.0517E−01 | 9.5304E−02 | −1.6407E−02 | 1.2120E−03 |
| S8 | −4.9512E−01 | 1.1343E−01 | −1.4217E−02 | 7.5164E−04 |
| S9 | −6.8297E−01 | 1.6449E−01 | −2.1715E−02 | 1.2076E−03 |
| S10 | 6.7409E−02 | −1.5081E−02 | 1.8625E−03 | −9.7165E−05 |
| S11 | 5.2539E−02 | −9.3519E−03 | 9.2371E−04 | −3.8832E−05 |
| S12 | 1.1494E−02 | −1.6399E−03 | 1.3393E−04 | −4.7922E−06 |

Table 3 shows the effective focal lengths f1-f6 of the lenses, the total effective focal length f of the imaging lens assembly, and the half of the maximal field-of-view HFOV of the imaging lens assembly in embodiment 1.

TABLE 3

| parameter | f1(mm) | f2(mm) | f3(mm) | f4(mm) | f5(mm) | f6(mm) | f(mm) | HFOV(°) |
|---|---|---|---|---|---|---|---|---|
| numerical value | 2.87 | −5.46 | 954.41 | 7.23 | −9.08 | −5.84 | 5.07 | 26.6 |

According to Table 3, the effective focal length f3 of the third lens E3 and the effective focal length f4 of the fourth lens E4 satisfy: f4/f3=0.01. The total effective focal length f of the imaging lens assembly and the effective focal length f5 of the fifth lens E5 satisfy: f/f5=−0.56. The total effective focal length f of the imaging lens assembly and the effective focal length f6 of the sixth lens E6 satisfy: f/f6=−0.87. Combining Table 1 and Table 3 it may be obtained that, the radius of curvature R1 of the object-side surface S1 of the first lens E1 and the total effective focal length f of the imaging lens assembly satisfy: R1/f=0.24. The total effective focal length f of the imaging lens assembly and the radius of curvature R10 of the image-side surface S10 of the fifth lens E5 satisfy: f/R10=−1.43. The air spacing T34 between the third lens E3 and the fourth lens E4 on the optical axis and the total effective focal length f of the imaging lens assembly satisfy: T34/f=0.13. The center thickness CT4 of the fourth lens E4 on the optical axis and the total effective focal length f of the imaging lens assembly satisfy: CT4/f=0.11. The total effective focal length f of the imaging lens assembly and the center thickness CT6 of the sixth lens E6 on the optical axis satisfy: f/CT6=15.27. The axial distance TTL from the object-side surface S1 of the first lens E1 to the image plane S15 of the imaging lens assembly and the total effective focal length f of the imaging lens assembly satisfy: TTL/f=0.96.

In addition, in embodiment 1, the center thickness CT6 of the sixth lens E6 on the optical axis and the edge thickness ET6 of the sixth lens E6 at the maximum radius satisfy: CT6/ET6=1.05. The axial distance TTL from the object-side surface S1 of the first lens E1 to the image plane S15 of the imaging lens assembly and ImgH, ImgH being half of the diagonal length of the effective pixel area on the image plane S15, satisfy: TTL/ImgH=1.88. The total effective focal length f of the imaging lens assembly and the entrance pupil diameter EPD of the imaging lens assembly satisfy: f/EPD=2.64.

Figures 2A, 2B:
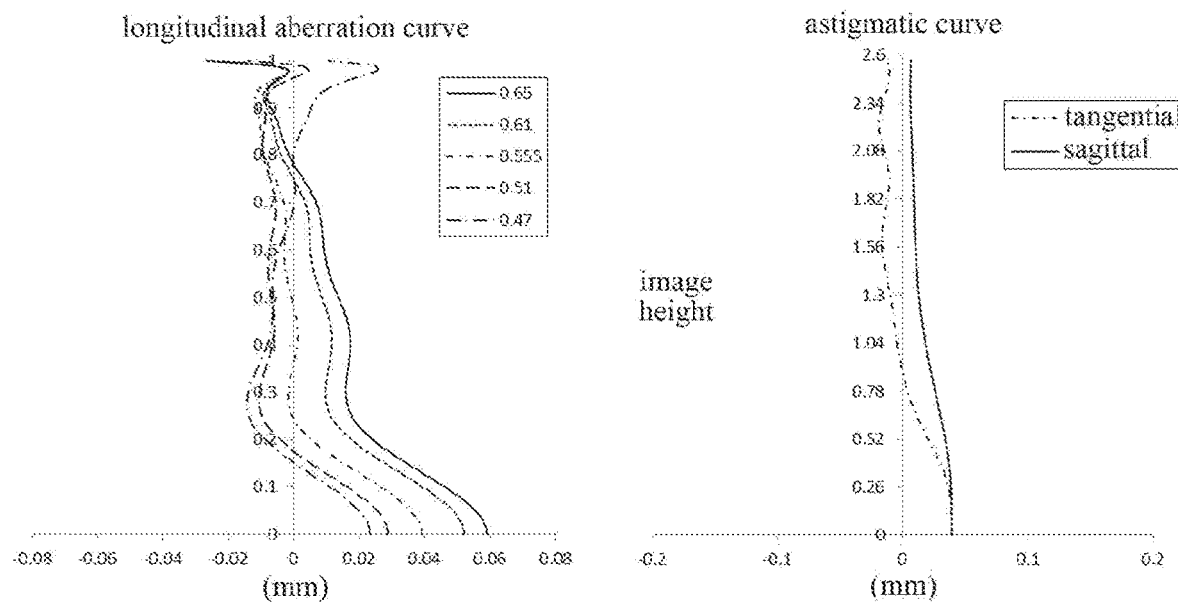
FIGS. 2A-2D respectively illustrate a longitudinal aberration curve, an astigmatic curve, a distortion curve and a lateral color curve of the imaging lens assembly according to embodiment 1.
Figures 2C, 2D:
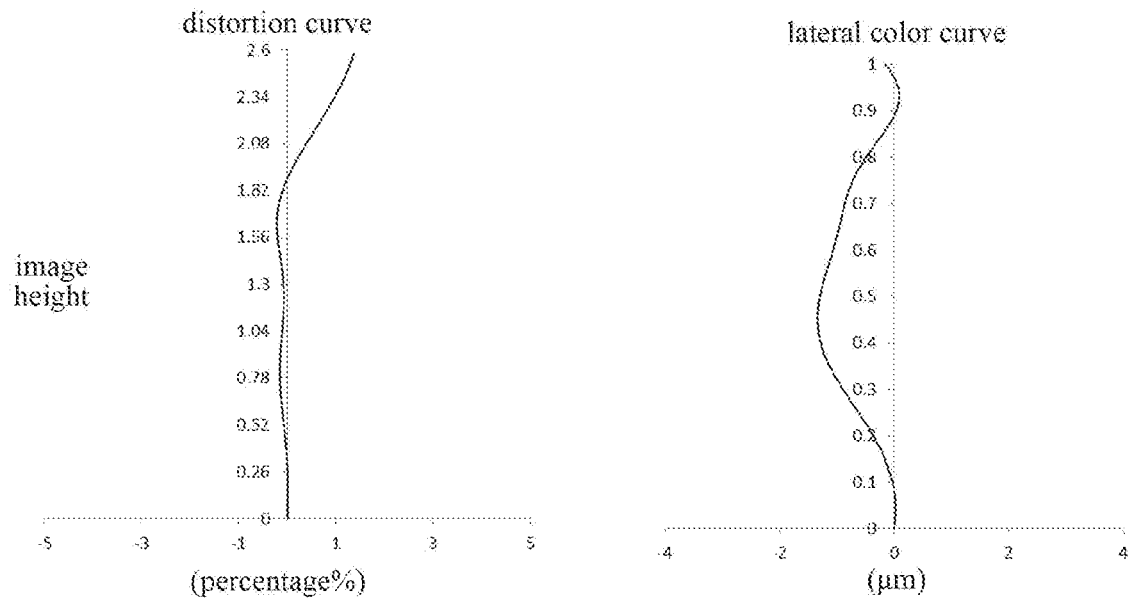

FIG. 2A illustrates a longitudinal aberration curve of the imaging lens assembly according to embodiment 1, representing deviations of focal points of light of different wavelengths converged after passing through the imaging lens assembly. FIG. 2B illustrates an astigmatic curve of the imaging lens assembly according to embodiment 1, representing a curvature of a tangential image plane and a curvature of a sagittal image plane. FIG. 2C illustrates a distortion curve of the imaging lens assembly according to embodiment 1, representing amounts of distortion at different viewing angles. FIG. 2D illustrates a lateral color curve of the imaging lens assembly according to embodiment 1, representing deviations of different image heights on an image plane after light passes through the imaging lens assembly. It can be known according to FIGS. 2A-2D that the imaging lens assembly provided in embodiment 1 can achieve a good image quality.

Embodiment 2

Figure 3:
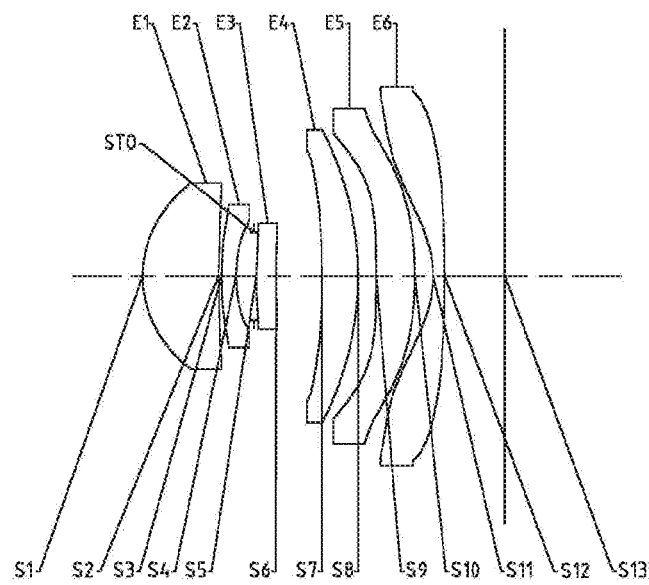
FIG. 3 illustrates a schematic structural diagram of an imaging lens assembly according to embodiment 2 of the present disclosure.

An imaging lens assembly according to embodiment 2 of the present disclosure is described below with reference to FIGS. 3-4D. In some embodiments and the following embodiments, for the purpose of brevity, the description of parts similar to those in embodiment 1 will be omitted. FIG. 3 illustrates a schematic structural diagram of the imaging lens assembly according to embodiment 2 of the present disclosure.

As shown in FIG. 3, the imaging lens assembly includes, along an optical axis, six lenses E1-E6 arranged in sequence from an object side to an image side. The first lens E1 has a positive refractive power, and an object-side surface S1 and an image-side surface S2 of the first lens are aspheric surfaces. The second lens E2 has a negative refractive power, an object-side surface S3 of the second lens is a spherical surface, and an image-side surface S4 of the second lens is an aspheric surface. The third lens E3 has a positive refractive power, an object-side surface S5 of the third lens is an aspheric surface, and an image-side surface S6 of the third lens is a spherical surface. The fourth lens E4 has a positive refractive power, an object-side surface S7 of the fourth lens is an aspheric surface, and an image-side surface S8 of the fourth lens is a spherical surface. The fifth lens E5 has a positive refractive power, and an object-side surface S9 and an image-side surface S10 of the fifth lens are aspheric surfaces. The sixth lens E6 has a negative refractive power, and an object-side surface S11 and an image-side surface S12 of the sixth lens are aspheric surfaces. In the imaging lens assembly of this embodiment, a diaphragm STO for limiting light beams may also be arranged, for example, between the second lens E2 and the third lens E3, to improve the image quality. Light from an object sequentially passes through the surfaces S1 to S12 and finally forms an image on an image plane S13.

Table 4 shows the surface type, the radius of curvature, the thickness, the material and the conic coefficient of each lens of the imaging lens assembly in embodiment 2. The radius of curvature and the thickness are shown in millimeters (mm). Table 5 shows the high-order coefficients of the aspheric mirror surfaces in embodiment 2. Table 6 shows the effective focal lengths f1-f6 of the lenses, the total effective focal length f of the imaging lens assembly, and the half of the maximal field-of-view HFOV of the imaging lens assembly in embodiment 2. A surface type of each aspheric surface may be defined by the formula (1) provided in embodiment 1.

TABLE 4

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.4766 | 1.0067 | 1.55 | 56.1 | −1.6171 |
| S2 | aspheric | 11.1899 | 0.0419 | | | −1.2533 |
| S3 | spherical | 4.6833 | 0.1900 | 1.67 | 20.4 | 0.0000 |
| S4 | aspheric | 1.8778 | 0.2403 | | | −1.5660 |
| STO | spherical | infinite | 0.0302 | | | 0.0000 |
| S5 | aspheric | 8.4200 | 0.2638 | 1.54 | 55.9 | 2.1945 |
| S6 | spherical | 21.0339 | 0.6069 | | | 0.0000 |
| S7 | aspheric | −13.6458 | 0.4801 | 1.64 | 23.5 | 44.7210 |
| S8 | spherical | −4.2446 | 0.2417 | | | 0.0000 |
| S9 | aspheric | −57.8715 | 0.5155 | 1.55 | 56.1 | 67.0729 |
| S10 | aspheric | −4.6486 | 0.2417 | | | 3.1248 |
| S11 | aspheric | −1.4590 | 0.1512 | 1.54 | 55.9 | −1.3397 |
| S12 | aspheric | −24.2195 | 0.8000 | | | 90.6728 |
| S13 | spherical | infinite | | | | |

TABLE 5

| surface number | A4 | A6 | A8 | A10 | A12 |
|---|---|---|---|---|---|
| S1 | 5.9324E−02 | 4.4290E−03 | −2.4576E−06 | 3.7748E−03 | −1.5999E−03 |
| S2 | 3.7388E−05 | −6.3381E−04 | −1.7545E−03 | −2.5663E−03 | −1.9686E−03 |
| S3 | — | — | — | — | — |
| S4 | 7.8329E−02 | 9.1537E−02 | −5.9035E−01 | 2.6145E+00 | −4.9665E+00 |
| S5 | 1.5225E−03 | 8.1482E−03 | 7.5895E−02 | −5.1519E−01 | 1.1889E+00 |
| S6 | — | — | — | — | — |
| S7 | 6.9836E−03 | −1.9800E−02 | 5.1304E−03 | 8.8926E−04 | 4.0460E−04 |
| S8 | — | — | — | — | — |
| S9 | −5.1295E−02 | 8.5695E−04 | 4.3635E−04 | −7.3517E−06 | 2.0703E−06 |
| S10 | −8.2605E−03 | −7.3216E−04 | 4.1866E−06 | 1.2931E−04 | 1.0348E−05 |
| S11 | 3.6652E−02 | 3.3641E−03 | −8.0650E−04 | −3.4091E−05 | 5.2483E−07 |
| S12 | −7.9851E−03 | 2.6587E−03 | −8.4644E−04 | 1.2708E−04 | −5.5743E−06 |

| surface number | A14 | A16 | A18 | A20 |
|---|---|---|---|---|
| S1 | 3.7713E−04 | 1.1457E−05 | −4.1138E−05 | −7.5131E−05 |
| S2 | −4.5341E−04 | 1.2470E−03 | 1.4535E−12 | 5.2187E−12 |
| S3 | — | — | — | — |
| S4 | 3.6474E+00 | 3.8215E−12 | 1.0865E−12 | 4.5057E−13 |
| S5 | −8.7922E−01 | 1.9484E−13 | 8.3709E−13 | 4.2787E−13 |
| S6 | — | — | — | — |
| S7 | −2.4947E−04 | 3.7806E−07 | −4.2042E−07 | −7.0945E−07 |
| S8 | — | — | — | — |
| S9 | −7.1883E−06 | 7.3320E−07 | 2.7163E−07 | 7.7732E−08 |
| S10 | −5.0810E−07 | −5.8704E−09 | −3.2037E−09 | −6.2631E−10 |
| S11 | 5.3276E−07 | 3.4165E−08 | 3.5466E−09 | 9.7224E−11 |
| S12 | −4.5512E−07 | 4.3894E−09 | 3.3374E−10 | −4.1432E−11 |

TABLE 6

| parameter | f1(mm) | f2(mm) | f3(mm) | f4(mm) | f5(mm) | f6(mm) | f(mm) | HFOV(°) |
|---|---|---|---|---|---|---|---|---|
| numerical value | 3.01 | −4.83 | 25.97 | 9.37 | 9.23 | −2.90 | 4.60 | 34.1 |

Figure 4A:
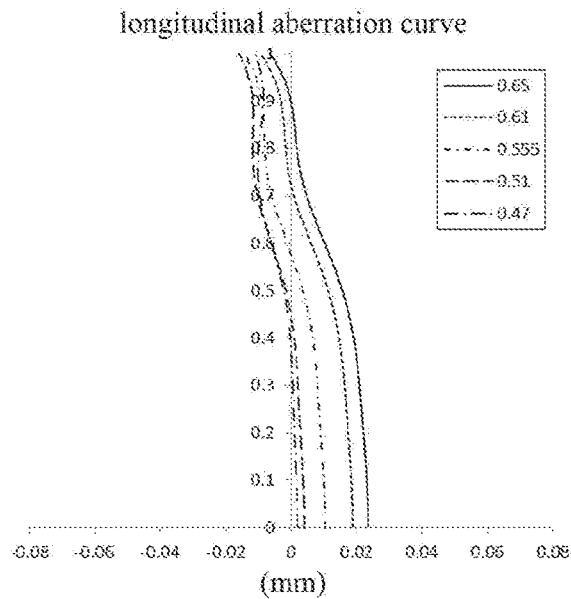
FIGS. 4A-4D respectively illustrate a longitudinal aberration curve, an astigmatic curve, a distortion curve and a lateral color curve of the imaging lens assembly according to embodiment 2.
Figure 4B:
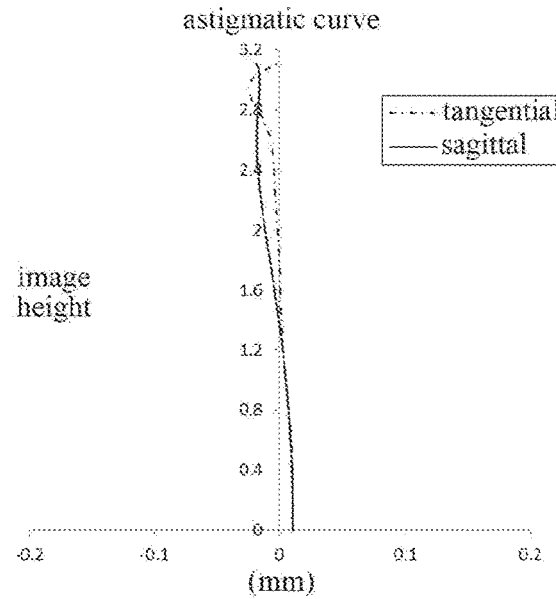
Figure 4C:
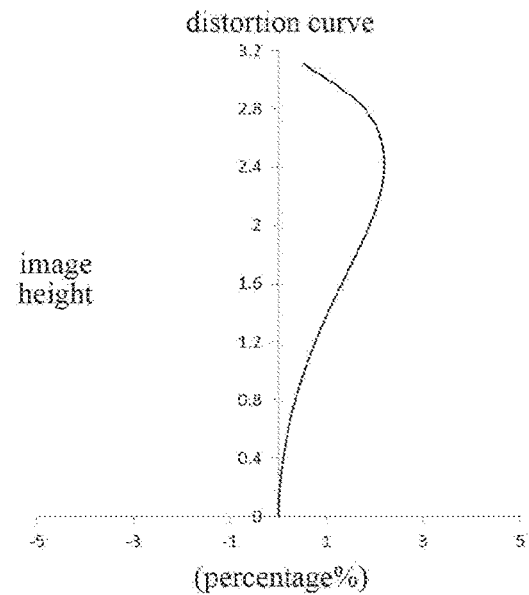
Figure 4D:
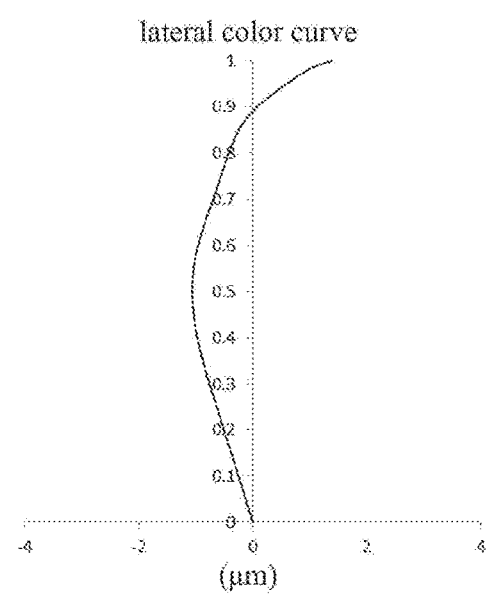

FIG. 4A illustrates a longitudinal aberration curve of the imaging lens assembly according to embodiment 2, representing deviations of focal points of light of different wavelengths converged after passing through the imaging lens assembly. FIG. 4B illustrates an astigmatic curve of the imaging lens assembly according to embodiment 2, representing a curvature of a tangential image plane and a curvature of a sagittal image plane. FIG. 4C illustrates a distortion curve of the imaging lens assembly according to embodiment 2, representing amounts of distortion at different viewing angles. FIG. 4D illustrates a lateral color curve of the imaging lens assembly according to embodiment 2, representing deviations of different image heights on an image plane after light passes through the imaging lens assembly. It can be known according to FIGS. 4A-4D that the imaging lens assembly provided in embodiment 2 can achieve a good image quality.

Embodiment 3

Figure 5:
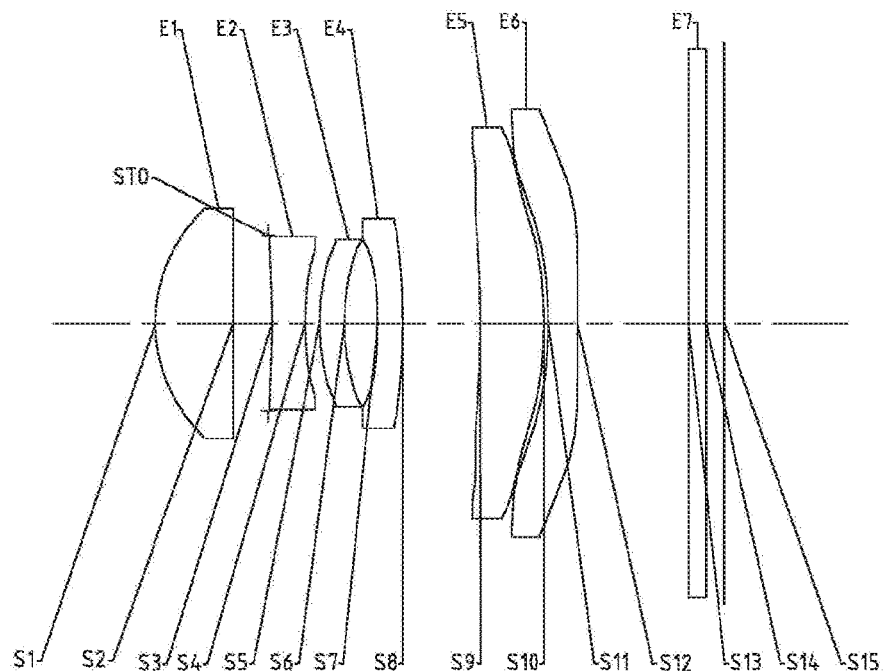
FIG. 5 illustrates a schematic structural diagram of an imaging lens assembly according to embodiment 3 of the present disclosure.

An imaging lens assembly according to embodiment 3 of the present disclosure is described below with reference to FIGS. 5-6D. FIG. 5 illustrates a schematic structural diagram of the imaging lens assembly according to embodiment 3 of the present disclosure.

As shown in FIG. 5, the imaging lens assembly includes, along an optical axis, six lenses E1-E6 arranged in sequence from an object side to an image side. The first lens E1 has a positive refractive power, and an object-side surface S1 and an image-side surface S2 of the first lens are aspheric surfaces. The second lens E2 has a negative refractive power, and an object-side surface S3 and an image-side surface S4 of the second lens are aspheric surfaces. The third lens E3 has a negative refractive power, and an object-side surface S5 and an image-side surface S6 of the third lens are aspheric surfaces. The fourth lens E4 has a negative refractive power, and an object-side surface S7 and an image-side surface S8 of the fourth lens are aspheric surfaces. The fifth lens E5 has a positive refractive power, and an object-side surface S9 and an image-side surface S10 of the fifth lens are aspheric surfaces. The sixth lens E6 has a negative refractive power, and an object-side surface S11 and an image-side surface S12 of the sixth lens are aspheric surfaces. Alternatively, the imaging lens assembly may further include an optical filter E7 having an object-side surface S13 and an image-side surface S14. In the imaging lens assembly of this embodiment, a diaphragm STO for limiting light beams may also be arranged, for example, between the first lens E1 and the second lens E2, to improve the image quality. Light from an object sequentially passes through the surfaces S1 to S14 and finally forms an image on an image plane S15.

Table 7 shows the surface type, the radius of curvature, the thickness, the material and the conic coefficient of each lens of the imaging lens assembly in embodiment 3. The radius of curvature and the thickness are shown in millimeters (mm). Table 8 shows the high-order coefficients of the aspheric mirror surfaces in embodiment 3. Table 9 shows the effective focal lengths f1-f6 of the lenses, the total effective focal length f of the imaging lens assembly, and the half of the maximal field-of-view HFOV of the imaging lens assembly in embodiment 3. A surface type of each aspheric surface may be defined by the formula (1) provided in embodiment 1.

TABLE 7

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.8700 | 0.9432 | 1.55 | 56.1 | 0.0041 |
| S2 | aspheric | 111.2973 | 0.4214 | | | 99.0000 |
| STO | spherical | infinite | 0.0500 | | | 0.0000 |
| S3 | aspheric | −12.0725 | 0.4000 | 1.67 | 20.4 | −99.0000 |
| S4 | aspheric | 4.1914 | 0.1740 | | | −1.5020 |
| S5 | aspheric | 2.9148 | 0.3000 | 1.55 | 56.1 | 0.9800 |
| S6 | aspheric | 2.7341 | 0.4041 | | | 0.9400 |
| S7 | aspheric | −8.5784 | 0.3000 | 1.55 | 56.1 | 55.5159 |
| S8 | aspheric | −17.6498 | 0.9450 | | | 99.0000 |
| S9 | aspheric | −94.4181 | 0.7697 | 1.67 | 20.4 | −99.0000 |
| S10 | aspheric | −6.2396 | 0.0552 | | | −0.7030 |
| S11 | aspheric | −4.8979 | 0.3500 | 1.54 | 55.9 | −31.6648 |
| S12 | aspheric | 156.5831 | 1.3492 | | | 99.0000 |
| S13 | spherical | infinite | 0.2100 | 1.52 | 64.2 | |
| S14 | spherical | infinite | 0.2181 | | | |
| S15 | spherical | infinite | | | | |

TABLE 8

| surface number | A4 | A6 | A8 | A10 | A12 |
|---|---|---|---|---|---|
| S1 | −6.2596E−04 | −1.0764E−02 | 2.3720E−02 | −3.4946E−02 | 3.1012E−02 |
| S2 | −5.7804E−03 | 8.3091E−03 | −2.0865E−02 | 3.5473E−02 | −3.6487E−02 |
| S3 | −4.7463E−03 | −1.4221E−02 | 1.1807E−01 | −3.1757E−01 | 5.4741E−01 |
| S4 | 2.0735E−02 | 3.5338E−02 | −5.3468E−02 | −1.7804E−01 | 1.6608E+00 |
| S5 | −1.2280E−02 | −1.7809E−03 | 3.7222E−01 | −1.6061E+00 | 3.9965E+00 |
| S6 | −6.3233E−02 | 1.2316E−01 | −1.7384E−01 | 3.4595E−01 | −4.9387E−01 |
| S7 | −1.5923E−01 | 5.7838E−02 | 2.8709E−01 | −8.7229E−01 | 1.4651E+00 |
| S8 | −1.1188E−01 | 1.3208E−01 | −7.6361E−02 | 1.1764E−01 | −1.9515E−01 |
| S9 | −3.6352E−02 | −2.1184E−02 | 6.1650E−02 | −4.7187E−02 | 2.0454E−02 |
| S10 | −7.5094E−04 | −6.3111E−02 | 6.1268E−02 | −2.8978E−02 | 9.2727E−03 |
| S11 | −5.1397E−03 | −1.4491E−02 | −7.0252E−03 | 1.2588E−02 | −6.0203E−03 |
| S12 | −1.4868E−02 | 2.8788E−02 | −3.6965E−02 | 2.1226E−02 | −7.0568E−03 |

TABLE 8-continued

| surface number | A14 | A16 | A18 | A20 |
|---|---|---|---|---|
| S1 | −1.6982E−02 | 5.4696E−03 | −9.2649E−04 | 5.9226E−05 |
| S2 | 2.3053E−02 | −8.7845E−03 | 1.8621E−03 | −1.7128E−04 |
| S3 | −6.0551E−01 | 4.1383E−01 | −1.5961E−01 | 2.6626E−02 |
| S4 | −4.7062E+00 | 6.6797E+00 | −4.8100E+00 | 1.3964E+00 |
| S5 | −6.1480E+00 | 5.7842E+00 | −3.0433E+00 | 6.8118E−01 |
| S6 | 3.2631E−01 | 1.0231E−01 | −2.4497E−01 | 8.5683E−02 |
| S7 | −1.6366E+00 | 1.0529E+00 | −2.9424E−01 | 4.4968E−03 |
| S8 | 1.5243E−01 | −5.3394E−02 | 4.8553E−03 | 9.0347E−04 |
| S9 | −5.6407E−03 | 9.7835E−04 | −9.7114E−05 | 4.1981E−06 |
| S10 | −2.1796E−03 | 3.5139E−04 | −3.3361E−05 | 1.3739E−06 |
| S11 | 1.5212E−03 | −2.2076E−04 | 1.7337E−05 | −5.7033E−07 |
| S12 | 1.4395E−03 | −1.7626E−04 | 1.1848E−05 | −3.3598E−07 |

TABLE 9

| parameter | f1(mm) | f2(mm) | f3(mm) | f4(mm) | f5(mm) | f6(mm) | f(mm) | HFOV(°) |
|---|---|---|---|---|---|---|---|---|
| numerical value | 3.47 | −4.62 | −195.12 | −30.93 | 9.99 | −8.84 | 7.48 | 24.7 |

Figures 6A, 6B:
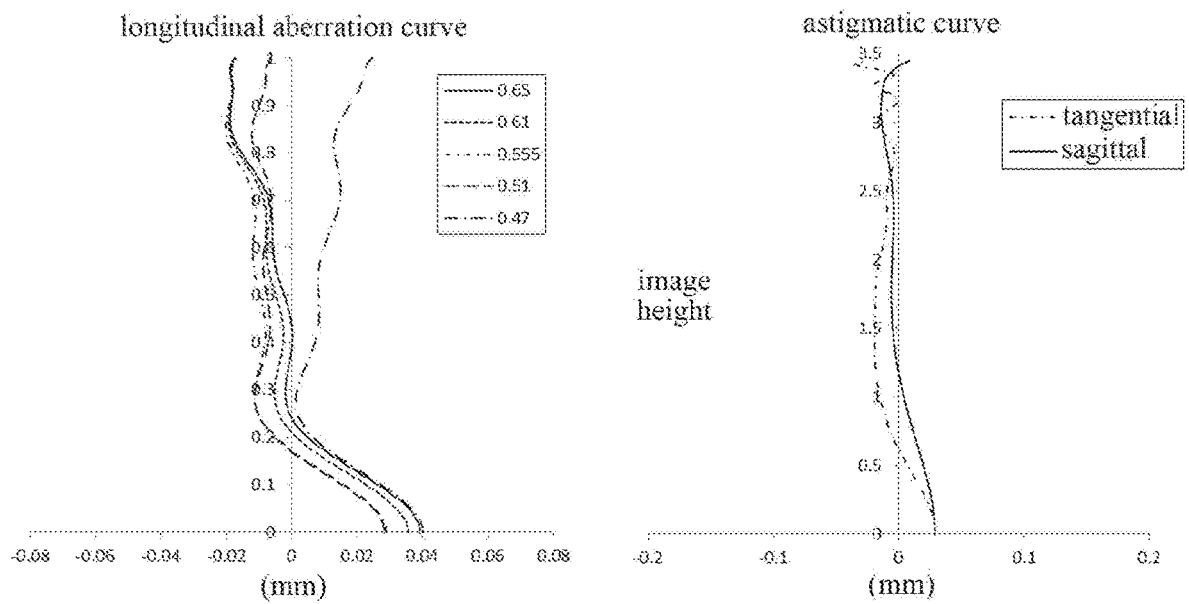
FIGS. 6A-6D respectively illustrate a longitudinal aberration curve, an astigmatic curve, a distortion curve and a lateral color curve of the imaging lens assembly according to embodiment 3.
Figures 6C, 6D:
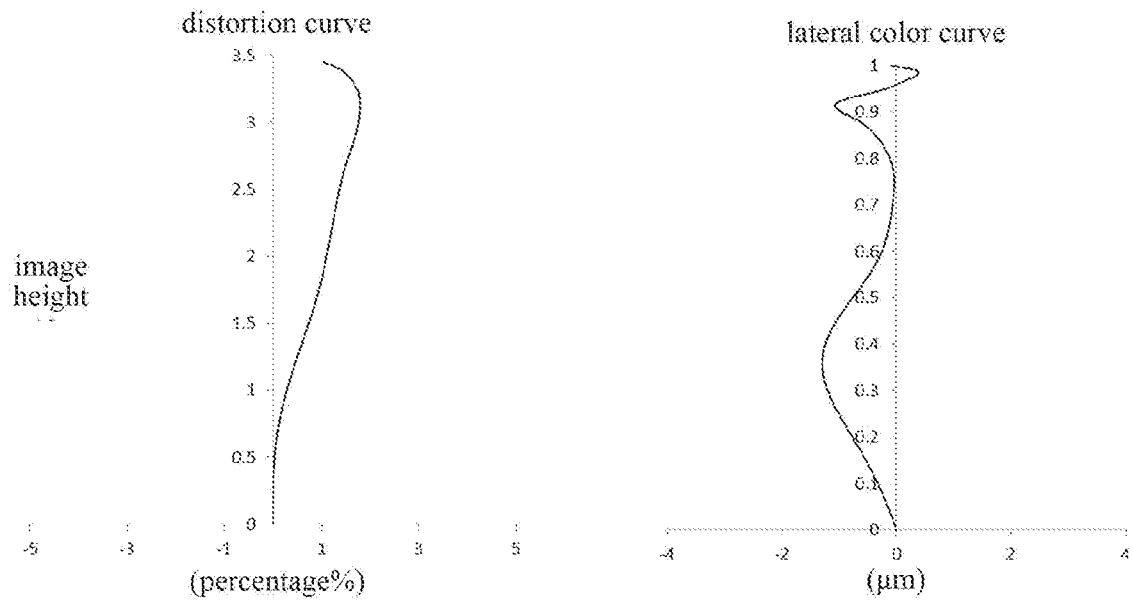

FIG. 6A illustrates a longitudinal aberration curve of the imaging lens assembly according to embodiment 3, representing deviations of focal points of light of different wavelengths converged after passing through the imaging lens assembly. FIG. 6B illustrates an astigmatic curve of the imaging lens assembly according to embodiment 3, representing a curvature of a tangential image plane and a curvature of a sagittal image plane. FIG. 6C illustrates a distortion curve of the imaging lens assembly according to embodiment 3, representing amounts of distortion at different viewing angles. FIG. 6D illustrates a lateral color curve of the imaging lens assembly according to embodiment 3, representing deviations of different image heights on an image plane after light passes through the imaging lens assembly. It can be known according to FIGS. 6A-6D that the imaging lens assembly provided in embodiment 3 can achieve a good image quality.

Embodiment 4

Figure 7:
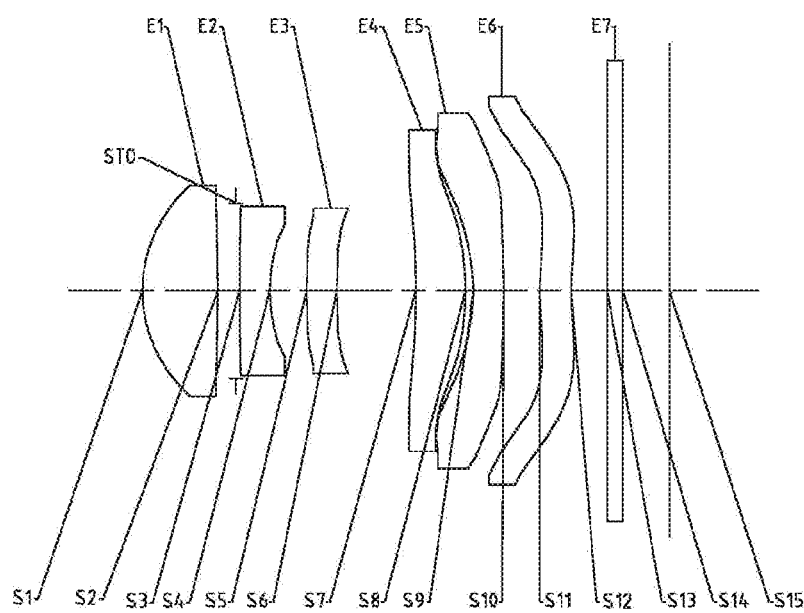
FIG. 7 illustrates a schematic structural diagram of an imaging lens assembly according to embodiment 4 of the present disclosure.

An imaging lens assembly according to embodiment 4 of the present disclosure is described below with reference to FIGS. 7-8D. FIG. 7 illustrates a schematic structural diagram of the imaging lens assembly according to embodiment 4 of the present disclosure.

As shown in FIG. 7, the imaging lens assembly includes, along an optical axis, six lenses E1-E6 arranged in sequence from an object side to an image side. The first lens E1 has a positive refractive power, and an object-side surface S1 and an image-side surface S2 of the first lens are aspheric surfaces. The second lens E2 has a negative refractive power, and an object-side surface S3 and an image-side surface S4 of the second lens are aspheric surfaces. The third lens E3 has a positive refractive power, and an object-side surface S5 and an image-side surface S6 of the third lens are aspheric surfaces. The fourth lens E4 has a positive refractive power, and an object-side surface S7 and an image-side surface S8 of the fourth lens are aspheric surfaces. The fifth lens E5 has a negative refractive power, and an object-side surface S9 and an image-side surface S10 of the fifth lens are aspheric surfaces. The sixth lens E6 has a positive refractive power, and an object-side surface S11 and an image-side surface S12 of the sixth lens are aspheric surfaces. Alternatively, the imaging lens assembly may further include an optical filter E7 having an object-side surface S13 and an image-side surface S14. In the imaging lens assembly of this embodiment, a diaphragm STO for limiting light beams may also be arranged, for example, between the first lens E1 and the second lens E2, to improve the image quality. Light from an object sequentially passes through the surfaces S1 to S14 and finally forms an image on an image plane S15.

Table 10 shows the surface type, the radius of curvature, the thickness, the material and the conic coefficient of each lens of the imaging lens assembly in embodiment 4. The radius of curvature and the thickness are shown in millimeters (mm). Table 11 shows the high-order coefficients of the aspheric mirror surfaces in embodiment 4. Table 12 shows the effective focal lengths f1-f6 of the lenses, the total effective focal length f of the imaging lens assembly, and the half of the maximal field-of-view HFOV of the imaging lens assembly in embodiment 4. A surface type of each aspheric surface may be defined by the formula (1) provided in embodiment 1.

TABLE 10

| surface number | surface type | radius of curvature | thickness | material | | conic coefficient |
|---|---|---|---|---|---|---|
| | | | | refractive index | abbe number | |
| OBJ | spherical | infinite | infinite | | | |
| S1 | aspheric | 1.8220 | 1.0042 | 1.55 | 56.1 | −0.8859 |
| S2 | aspheric | −32.9971 | 0.2376 | | | −99.0000 |
| STO | spherical | infinite | 0.0500 | | | |

TABLE 10-continued

| surface number | surface type | radius of curvature | thickness | material refractive index | abbe number | conic coefficient |
|---|---|---|---|---|---|---|
| S3 | aspheric | 23.4296 | 0.4000 | 1.64 | 23.5 | −98.6960 |
| S4 | aspheric | 2.1606 | 0.4890 | | | −0.1295 |
| S5 | aspheric | 9.3334 | 0.4000 | 1.55 | 56.1 | 39.0069 |
| S6 | aspheric | 10.3414 | 1.0480 | | | 72.0831 |
| S7 | aspheric | −24.2487 | 0.6581 | 1.64 | 23.5 | 81.2617 |
| S8 | aspheric | −3.9917 | 0.1092 | | | −0.1259 |
| S9 | aspheric | −2.0686 | 0.4000 | 1.55 | 56.1 | −0.7285 |
| S10 | aspheric | −11.9267 | 0.4756 | | | 16.9080 |
| S11 | aspheric | 3.4173 | 0.4197 | 1.54 | 55.9 | −53.2090 |
| S12 | aspheric | 3.6536 | 0.4775 | | | −63.6512 |
| S13 | spherical | infinite | 0.2100 | 1.52 | 64.2 | |
| S14 | spherical | infinite | 0.6162 | | | |
| S15 | spherical | infinite | | | | |

TABLE 11

| surface number | A4 | A6 | A8 | A10 | A12 |
|---|---|---|---|---|---|
| S1 | 1.8723E−02 | −6.7044E−03 | 2.2577E−02 | −3.0860E−02 | 2.4964E−02 |
| S2 | −1.1911E−02 | 3.3335E−02 | −5.1946E−02 | 6.3356E−02 | −5.3846E−02 |
| S3 | −6.8982E−02 | 8.4449E−02 | 9.4814E−02 | −5.6120E−01 | 1.1686E+00 |
| S4 | −7.9768E−02 | 3.4926E−01 | −1.5828E+00 | 6.9666E+00 | −1.9970E+01 |
| S5 | −3.8173E−03 | 1.1474E−02 | 2.4663E−01 | −8.7857E−01 | 1.8371E+00 |
| S6 | 1.9259E−02 | 9.3306E−02 | −2.3591E−01 | 6.1611E−01 | −1.0894E+00 |
| S7 | −3.2069E−02 | −2.5916E−02 | 7.7155E−02 | −7.4381E−02 | 4.4262E−02 |
| S8 | −2.0003E−03 | −3.3974E−02 | 3.1853E−02 | −2.6558E−02 | 2.0466E−02 |
| S9 | 1.2896E−01 | −4.9518E−02 | −5.2989E−02 | 5.4964E−02 | −1.9470E−02 |
| S10 | 3.0400E−02 | 2.5980E−02 | −6.3859E−02 | 4.4630E−02 | −1.7684E−02 |
| S11 | −2.3534E−02 | −8.8547E−02 | 9.5668E−02 | −4.9717E−02 | 1.4207E−02 |
| S12 | −1.2849E−02 | −8.4533E−02 | 7.7024E−02 | −3.6315E−02 | 1.0380E−02 |

| surface number | A14 | A16 | A18 | A20 |
|---|---|---|---|---|
| S1 | −1.1181E−02 | 2.1303E−03 | 1.3022E−04 | −8.5148E−05 |
| S2 | 2.7649E−02 | −7.2578E−03 | 4.7080E−04 | 1.0043E−04 |
| S3 | −1.4186E+00 | 1.0341E+00 | −4.1820E−01 | 7.2101E−02 |
| S4 | 3.6029E+01 | −3.9489E+01 | 2.4027E+01 | −6.2183E+00 |
| S5 | −2.4885E+00 | 2.0915E+00 | −9.8169E−01 | 1.9622E−01 |
| S6 | 1.1979E+00 | −8.1082E−01 | 3.1153E−01 | −5.2238E−02 |
| S7 | −1.6975E−02 | 3.9827E−03 | −5.1426E−04 | 2.7865E−05 |
| S8 | −9.1403E−03 | 2.1877E−03 | −2.6539E−04 | 1.2877E−05 |
| S9 | 3.0446E−03 | −1.1502E−04 | −2.1733E−05 | 1.9369E−06 |
| S10 | 4.3624E−03 | −6.5140E−04 | 5.3230E−05 | −1.8135E−06 |
| S11 | −2.2511E−03 | 1.8379E−04 | −5.6962E−06 | −3.8755E−08 |
| S12 | −1.8468E−03 | 1.9938E−04 | −1.1912E−05 | 3.0094E−07 |

TABLE 12

| parameter | f1(mm) | f2(mm) | f3(mm) | f4(mm) | f5(mm) | f6(mm) | f(mm) | HFOV(°) |
|---|---|---|---|---|---|---|---|---|
| numerical value | 3.20 | −3.72 | 153.83 | 7.32 | −4.65 | 60.77 | 7.50 | 24.7 |

Figure 8A:
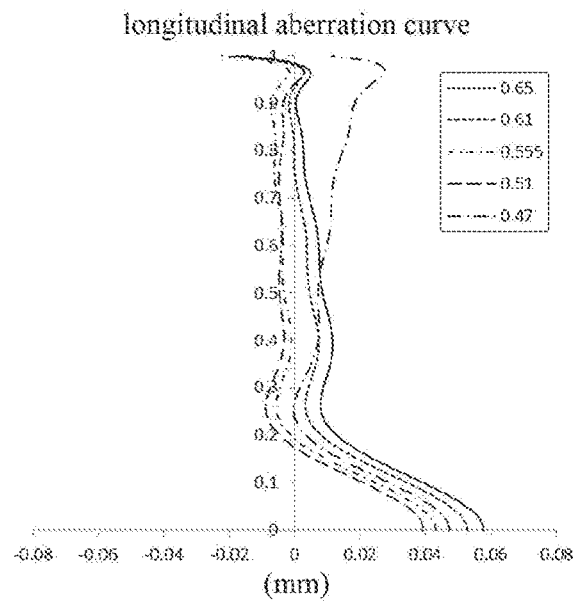
FIGS. 8A-8D respectively illustrate a longitudinal aberration curve, an astigmatic curve, a distortion curve and a lateral color curve of the imaging lens assembly according to embodiment 4.
Figure 8B:
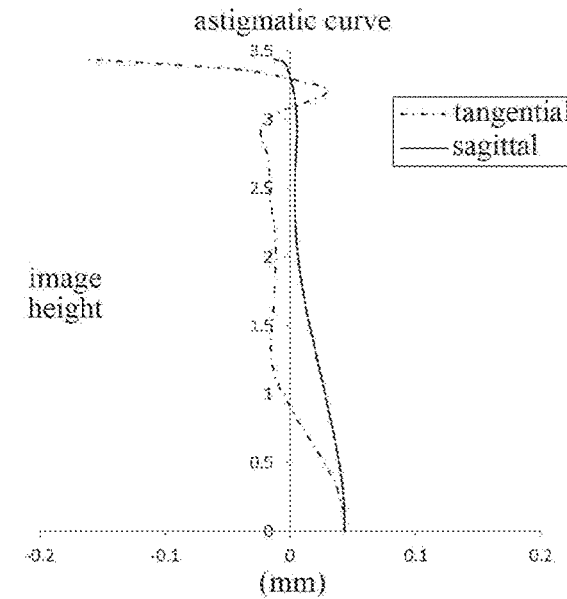
Figure 8C:
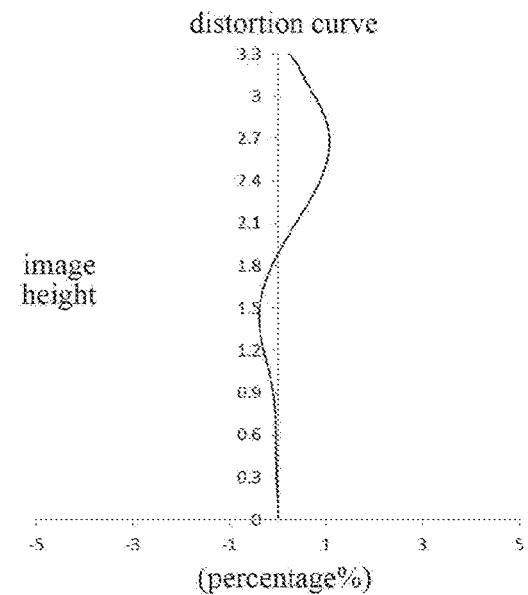
Figure 8D:
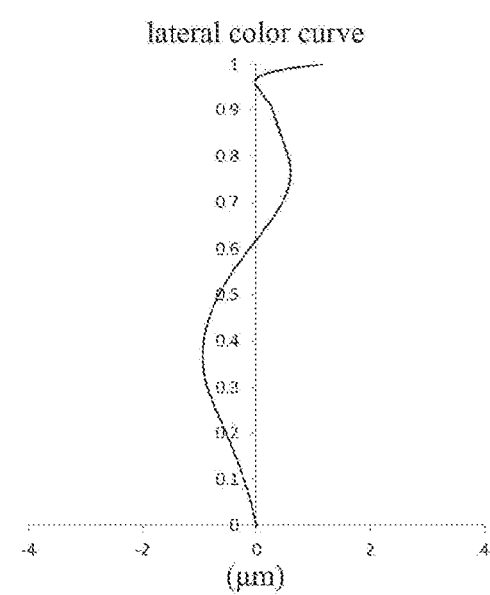

FIG. 8A illustrates a longitudinal aberration curve of the imaging lens assembly according to embodiment 4, representing deviations of focal points of light of different wavelengths converged after passing through the imaging lens assembly. FIG. 8B illustrates an astigmatic curve of the imaging lens assembly according to embodiment 4, representing a curvature of a tangential image plane and a curvature of a sagittal image plane. FIG. 8C illustrates a distortion curve of the imaging lens assembly according to embodiment 4, representing amounts of distortion at different viewing angles. FIG. 8D illustrates a lateral color curve of the imaging lens assembly according to embodiment 4, representing deviations of different image heights on an image plane after light passes through the imaging lens assembly. It can be known according to FIGS. 8A-8D that the imaging lens assembly provided in embodiment 4 can achieve a good image quality.

Embodiment 5

An imaging lens assembly according to embodiment 5 of the present disclosure is described below with reference to FIGS. 9-10D. FIG. 9 illustrates a schematic structural diagram of the imaging lens assembly according to embodiment 5 of the present disclosure.

As shown in FIG. 9, the imaging lens assembly includes, along an optical axis, six lenses E1-E6 arranged in sequence from an object side to an image side. The first lens E1 has a positive refractive power, and an object-side surface S1 and an image-side surface S2 of the first lens are aspheric surfaces. The second lens E2 has a negative refractive power, and an object-side surface S3 and an image-side surface S4 of the second lens are aspheric surfaces. The third lens E3 has a positive refractive power, and an object-side surface S5 and an image-side surface S6 of the third lens are aspheric surfaces. The fourth lens E4 has a positive refractive power, and an object-side surface S7 and an image-side surface S8 of the fourth lens are aspheric surfaces. The fifth lens E5 has a negative refractive power, and an object-side surface S9 and an image-side surface S10 of the fifth lens are aspheric surfaces. The sixth lens E6 has a negative refractive power, and an object-side surface S11 and an image-side surface S12 of the sixth lens are aspheric surfaces. Alternatively, the imaging lens assembly may further include an optical filter E7 having an object-side surface S13 and an image-side surface S14. In the imaging lens assembly of this embodiment, a diaphragm STO for limiting light beams may also be arranged, for example, between the object side and the first lens E1, to improve the image quality. Alternatively, the imaging lens assembly may further include a vignetting diaphragm ST1 arranged between the second lens E2 and the third lens E3. Light from an object sequentially passes through the surfaces S1 to S14 and finally forms an image on an image plane S15.

Table 13 shows the surface type, the radius of curvature, the thickness, the material and the conic coefficient of each lens of the imaging lens assembly in embodiment 5. The radius of curvature and the thickness are shown in millimeters (mm). Table 14 shows the high-order coefficients of the aspheric mirror surfaces in embodiment 5. Table 15 shows the effective focal lengths f1-f6 of the lenses, the total effective focal length f of the imaging lens assembly, and the half of the maximal field-of-view HFOV of the imaging lens assembly in embodiment 5. A surface type of each aspheric surface may be defined by the formula (1) provided in embodiment 1.

TABLE 13

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4162 | | | |
| S1 | aspheric | 1.2518 | 0.6526 | 1.55 | 56.1 | −6.4302 |
| S2 | aspheric | 5.5758 | 0.1704 | | | −22.9054 |
| S3 | aspheric | 16.2359 | 0.4000 | 1.67 | 20.4 | 99.0000 |
| S4 | aspheric | 2.8215 | 0.1794 | | | −1.3684 |
| ST1 | spherical | infinite | 0.0970 | | | 0.0000 |
| S5 | aspheric | −342.9639 | 0.2600 | 1.55 | 56.1 | −99.0000 |
| S6 | aspheric | −52.0815 | 0.7081 | | | −99.0000 |
| S7 | aspheric | −14.3838 | 0.7173 | 1.64 | 23.5 | 66.0685 |
| S8 | aspheric | −3.4715 | 0.1025 | | | −0.2991 |
| S9 | aspheric | −1.8885 | 0.2400 | 1.55 | 56.1 | −1.6634 |
| S10 | aspheric | −3.0711 | 0.1070 | | | −17.0609 |
| S11 | aspheric | −3.6604 | 0.3300 | 1.54 | 55.9 | −14.0191 |
| S12 | aspheric | 9.8878 | 0.2356 | | | −99.0000 |
| S13 | spherical | infinite | 0.1300 | 1.52 | 64.2 | |
| S14 | spherical | infinite | 0.5000 | | | |
| S15 | spherical | infinite | | | | |

TABLE 14

| surface number | A4 | A6 | A8 | A10 | A12 |
|---|---|---|---|---|---|
| S1 | 4.1028E−01 | −5.6350E−01 | 1.0135E+00 | −1.0689E+00 | −3.2971E−01 |
| S2 | −3.6153E−02 | 2.7066E−01 | −1.9148E+00 | 9.5200E+00 | −2.9180E+01 |
| S3 | −5.5216E−02 | −1.0718E−01 | 2.3877E+00 | −1.3352E+01 | 4.4719E+01 |
| S4 | −1.7766E−02 | 9.5762E−01 | −9.9590E+00 | 8.8567E+01 | −4.9501E+02 |
| S5 | −1.5866E−01 | −1.2947E−02 | 3.8271E−01 | 5.8192E+00 | −4.6500E+01 |
| S6 | −1.3259E−01 | 3.2935E−01 | −1.5618E+00 | 7.4177E+00 | −2.1511E+01 |
| S7 | −3.4061E−02 | −1.5579E−01 | 3.9904E−01 | −6.4110E−01 | 6.2964E−01 |
| S8 | 3.1771E−01 | −9.0559E−01 | 1.1588E+00 | −8.5248E−01 | 3.6609E−01 |
| S9 | 3.5262E−01 | −7.3595E−01 | 6.7514E−01 | −2.5630E−01 | −3.5120E−02 |
| S10 | −1.0575E−01 | 5.1565E−01 | −8.0880E−01 | 6.5761E−01 | −3.1953E−01 |
| S11 | 2.4819E−03 | 2.6220E−02 | −5.7806E−02 | 4.2506E−02 | −1.8610E−02 |
| S12 | 3.0495E−02 | −1.9229E−01 | 1.9233E−01 | −1.0055E−01 | 3.1615E−02 |

TABLE 14-continued

| surface number | A14 | A16 | A18 | A20 |
|---|---|---|---|---|
| S1 | 3.1762E+00 | −4.7521E+00 | 3.2320E+00 | −8.6584E−01 |
| S2 | 5.5731E+01 | −6.4840E+01 | 4.2096E+01 | −1.1728E+01 |
| S3 | −9.5079E+01 | 1.2488E+02 | −9.2736E+01 | 2.9805E+01 |
| S4 | 1.7468E+03 | −3.7645E+03 | 4.5174E+03 | −2.3089E+03 |
| S5 | 1.6324E+02 | −3.1112E+02 | 3.1058E+02 | −1.2688E+02 |
| S6 | 3.9349E+01 | −4.4515E+01 | 2.8089E+01 | −7.4910E+00 |
| S7 | −3.5840E−01 | 1.1548E−01 | −1.9347E−02 | 1.2650E−03 |
| S8 | −8.7587E−02 | 9.9714E−03 | −1.9369E−04 | −3.6477E−05 |
| S9 | 7.1664E−02 | −2.7753E−02 | 4.7855E−03 | −3.1943E−04 |
| S10 | 9.6073E−02 | −1.7503E−02 | 1.7683E−03 | −7.5933E−05 |
| S11 | 5.3255E−03 | −9.5436E−04 | 9.5727E−05 | −4.0720E−06 |
| S12 | −6.1539E−03 | 7.2058E−04 | −4.6044E−05 | 1.2169E−06 |

TABLE 15

| parameter | f1(mm) | f2(mm) | f3(mm) | f4(mm) | f5(mm) | f6(mm) | f(mm) | HFOV(°) |
|---|---|---|---|---|---|---|---|---|
| numerical value | 2.81 | −5.19 | 112.44 | 6.92 | −9.68 | −4.94 | 5.07 | 32.7 |

Figures 10C, 10D:
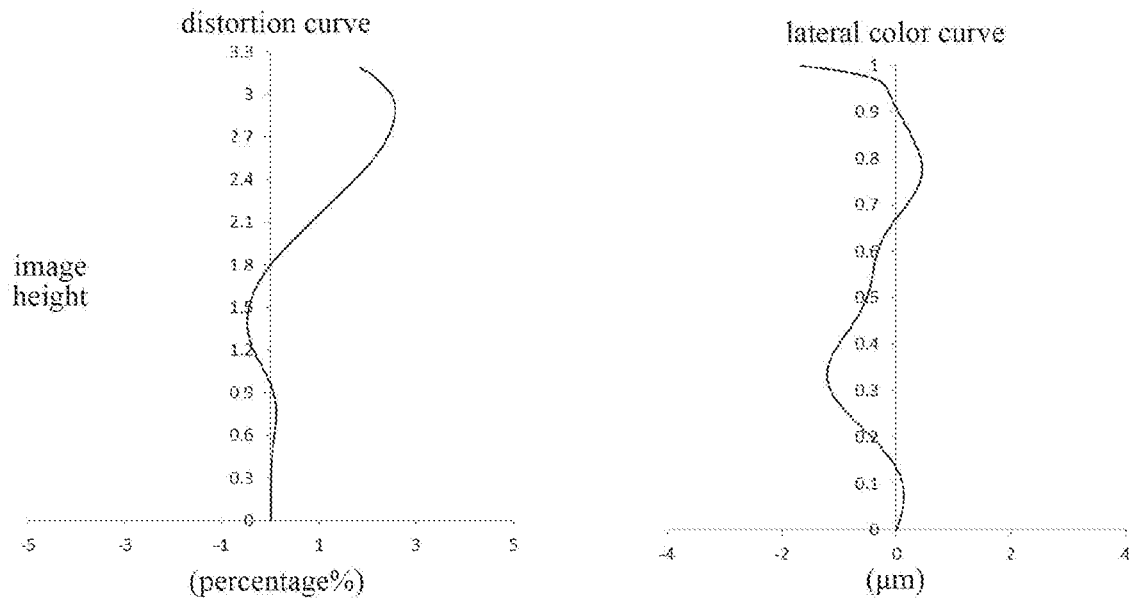

FIG. 10A illustrates a longitudinal aberration curve of the imaging lens assembly according to embodiment 5, representing deviations of focal points of light of different wavelengths converged after passing through the imaging lens assembly. FIG. 10B illustrates an astigmatic curve of the imaging lens assembly according to embodiment 5, representing a curvature of a tangential image plane and a curvature of a sagittal image plane. FIG. 10C illustrates a distortion curve of the imaging lens assembly according to embodiment 5, representing amounts of distortion at different viewing angles. FIG. 10D illustrates a lateral color curve of the imaging lens assembly according to embodiment 5, representing deviations of different image heights on an image plane after light passes through the imaging lens assembly. It can be known according to FIGS. 10A-10D that the imaging lens assembly provided in embodiment 5 can achieve a good image quality.

Embodiment 6

Figure 11:
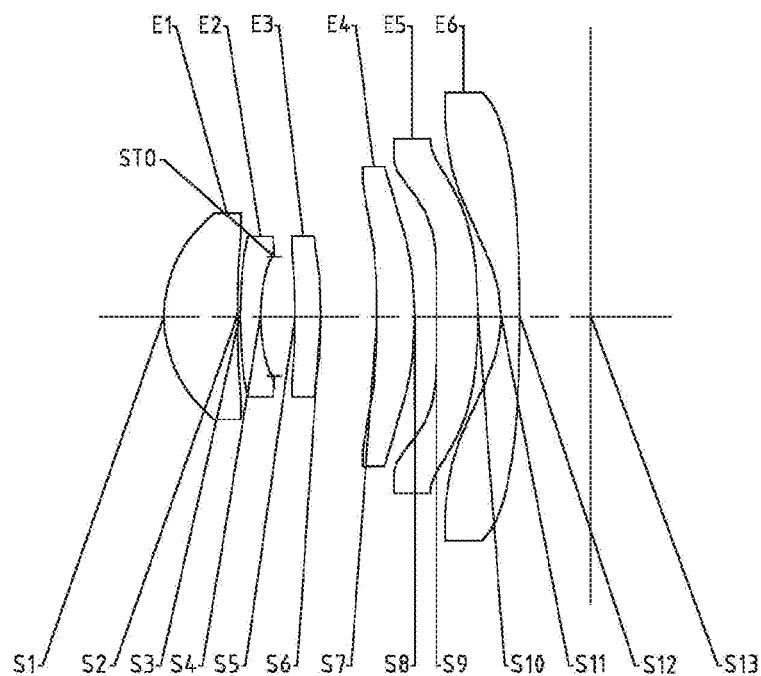
FIG. 11 illustrates a schematic structural diagram of an imaging lens assembly according to embodiment 6 of the present disclosure.

An imaging lens assembly according to embodiment 6 of the present disclosure is described below with reference to FIGS. 11-12D. FIG. 11 illustrates a schematic structural diagram of the imaging lens assembly according to embodiment 6 of the present disclosure.

As shown in FIG. 11, the imaging lens assembly includes, along an optical axis, six lenses E1-E6 arranged in sequence from an object side to an image side. The first lens E1 has a positive refractive power, and an object-side surface S1 and an image-side surface S2 of the first lens are aspheric surfaces. The second lens E2 has a negative refractive power, and an object-side surface S3 and an image-side surface S4 of the second lens are aspheric surfaces. The third lens E3 has a positive refractive power, and an object-side surface S5 and an image-side surface S6 of the third lens are aspheric surfaces. The fourth lens E4 has a positive refractive power, and an object-side surface S7 and an image-side surface S8 of the fourth lens are aspheric surfaces. The fifth lens E5 has a positive refractive power, and an object-side surface S9 and an image-side surface S10 of the fifth lens are aspheric surfaces. The sixth lens E6 has a negative refractive power, and an object-side surface S11 and an image-side surface S12 of the sixth lens are aspheric surfaces. In the imaging lens assembly of this embodiment, a diaphragm STO for limiting light beams may also be arranged, for example, between the second lens E2 and the third lens E3, to improve the image quality. Light from an object sequentially passes through the surfaces S1 to S12 and finally forms an image on an image plane S13.

Table 16 shows the surface type, the radius of curvature, the thickness, the material and the conic coefficient of each lens of the imaging lens assembly in embodiment 6. The radius of curvature and the thickness are shown in millimeters (mm). Table 17 shows the high-order coefficients of the aspheric mirror surfaces in embodiment 6. Table 18 shows the effective focal lengths f1-f6 of the lenses, the total effective focal length f of the imaging lens assembly, and the half of the maximal field-of-view HFOV of the imaging lens assembly in embodiment 6. A surface type of each aspheric surface may be defined by the formula (1) provided in embodiment 1.

TABLE 16

| surface number | surface type | radius of curvature | thickness | material | | conic coefficient |
|---|---|---|---|---|---|---|
| | | | | refractive index | abbe number | |
| OBJ | spherical | infinite | infinite | | | |
| S1 | aspheric | 1.4746 | 0.8254 | 1.55 | 56.1 | −1.5532 |
| S2 | aspheric | 11.8787 | 0.0300 | | | 4.5451 |
| S3 | aspheric | 4.8466 | 0.2300 | 1.67 | 20.4 | −4.6718 |
| S4 | aspheric | 2.0063 | 0.1593 | | | −3.3294 |

TABLE 16-continued

| surface number | surface type | radius of curvature | thickness | material refractive index | abbe number | conic coefficient |
|---|---|---|---|---|---|---|
| STO | spherical | infinite | 0.2289 | | | |
| S5 | aspheric | −24.6124 | 0.2920 | 1.54 | 55.9 | 95.0000 |
| S6 | aspheric | −9.3211 | 0.6332 | | | 94.9999 |
| S7 | aspheric | −12.1065 | 0.4228 | 1.64 | 23.5 | 44.7196 |
| S8 | aspheric | −4.3212 | 0.2474 | | | 0.9612 |
| S9 | aspheric | 225.8497 | 0.4727 | 1.55 | 56.1 | 67.0729 |
| S10 | aspheric | −4.8053 | 0.2582 | | | 3.0326 |
| S11 | aspheric | −1.4291 | 0.2100 | 1.54 | 55.9 | −1.4361 |
| S12 | aspheric | −26.3417 | 0.8000 | | | 90.6728 |
| S13 | spherical | infinite | | | | |

TABLE 17

| surface number | A4 | A6 | A8 | A10 | A12 |
|---|---|---|---|---|---|
| S1 | 6.2435E−02 | −1.3503E−02 | 1.1755E−01 | −3.3913E−01 | 5.9746E−01 |
| S2 | −2.9075E−02 | 1.9762E−01 | −5.9843E−01 | 9.5303E−01 | −1.7343E−01 |
| S3 | −5.0423E−02 | 1.4566E−01 | 3.6093E−01 | −4.4543E+00 | 1.8275E+01 |
| S4 | 2.2020E−02 | 3.3557E−01 | −1.3331E+00 | 1.3577E−02 | 3.9988E+01 |
| S5 | −5.7897E−02 | −5.2816E−01 | 4.8527E+00 | −2.7341E+01 | 9.8595E+01 |
| S6 | −6.9838E−02 | 1.0599E−01 | −7.5714E−01 | 3.3675E+00 | −8.5307E+00 |
| S7 | 2.5238E−02 | −1.9625E−01 | 3.5042E−01 | −3.8447E−01 | 2.6881E−01 |
| S8 | 7.6038E−02 | −2.6522E−01 | 2.8852E−01 | −1.2231E−01 | −2.8471E−02 |
| S9 | 4.4389E−02 | −1.6889E−01 | 4.7788E−01 | 5.0021E−02 | −3.6573E−02 |
| S10 | 3.7775E−02 | −1.2752E−02 | −7.7224E−02 | 9.4344E−02 | −5.1610E−02 |
| S11 | 3.6652E−02 | 3.3641E−03 | −8.0650E−04 | −3.4091E−05 | 5.2483E−07 |
| S12 | −7.9851E−03 | 2.6587E−03 | −8.4644E−04 | 1.2708E−04 | −5.5743E−06 |

| surface number | A14 | A16 | A18 | A20 |
|---|---|---|---|---|
| S1 | −6.4872E−01 | 4.2735E−01 | −1.5622E−01 | 2.3871E−02 |
| S2 | −2.1910+00 | 3.8380E+00 | −2.7397E+00 | 7.4271E−01 |
| S3 | −4.1046E+01 | 5.2939E+01 | −3.6764E+01 | 1.0682E+01 |
| S4 | −2.2191E+02 | 5.7124E+02 | −7.3631E+02 | 3.8444E+02 |
| S5 | −2.2524E+02 | 3.1768E+02 | −2.5231E+02 | 8.6328E+01 |
| S6 | 1.3431E+01 | −1.2462E+01 | 6.1311E+00 | −1.1677E+00 |
| S7 | −1.0510E−01 | 1.6568E−02 | 1.3776E−03 | −5.5803E−04 |
| S8 | 6.2402E−02 | −3.2160E−02 | 7.6018E−03 | −7.0321E−04 |
| S9 | 3.1896E−03 | 3.7604E−03 | −1.1927E−03 | 1.0404E−04 |
| S10 | 1.5599E−02 | −2.6443E−03 | 2.3287E−04 | −8.1648E−06 |
| S11 | 5.3276E−07 | 3.4165E−08 | 3.5466E−09 | 9.7224E−11 |
| S12 | −4.5512E−07 | 4.3894E−09 | 3.3374E−10 | −4.1432E−11 |

TABLE 18

| parameter | f1(mm) | f2(mm) | f3(mm) | f4(mm) | f5(mm) | f6(mm) | f(mm) | HFOV(°) |
|---|---|---|---|---|---|---|---|---|
| numerical value | 3.00 | −5.31 | 27.77 | 10.21 | 8.63 | −2.82 | 4.60 | 34.4 |

FIG. 12A illustrates a longitudinal aberration curve of the imaging lens assembly according to embodiment 6, representing deviations of focal points of light of different wavelengths converged after passing through the imaging lens assembly. FIG. 12B illustrates an astigmatic curve of the imaging lens assembly according to embodiment 6, representing a curvature of a tangential image plane and a curvature of a sagittal image plane. FIG. 12C illustrates a distortion curve of the imaging lens assembly according to embodiment 6, representing amounts of distortion at different viewing angles. FIG. 12D illustrates a lateral color curve of the imaging lens assembly according to embodiment 6, representing deviations of different image heights on an image plane after light passes through the imaging lens assembly. It can be known according to FIGS. 12A-12D that the imaging lens assembly provided in embodiment 6 can achieve a good image quality.

Embodiment 7

Figure 13:
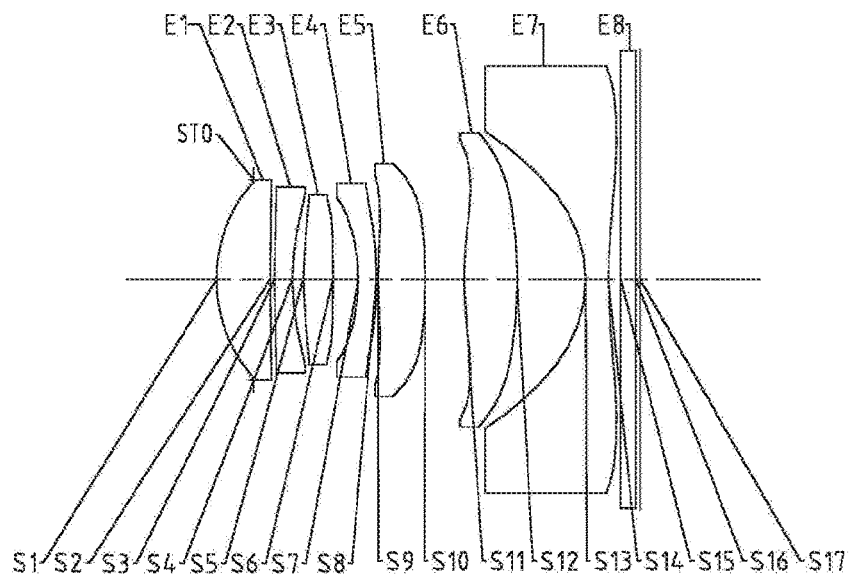
FIG. 13 illustrates a schematic structural diagram of an imaging lens assembly according to embodiment 7 of the present disclosure.

An imaging lens assembly according to embodiment 7 of the present disclosure is described below with reference to FIGS. 13-14D. FIG. 13 illustrates a schematic structural diagram of the imaging lens assembly according to embodiment 7 of the present disclosure.

As shown in FIG. 13, the imaging lens assembly includes, along an optical axis, six lenses E1-E6 arranged in sequence from an object side to an image side. The first lens E1 has a positive refractive power, and an object-side surface S1 and an image-side surface S2 of the first lens are aspheric surfaces. The second lens E2 has a negative refractive power, and an object-side surface S3 and an image-side surface S4 of the second lens are aspheric surfaces. The third lens E3 has a positive refractive power, and an object-side surface S5 and an image-side surface S6 of the third lens are aspheric surfaces. The fourth lens E4 has a positive refractive power, and an object-side surface S7 and an image-side surface S8 of the fourth lens are aspheric surfaces. The fifth lens E5 has a negative refractive power, and an object-side surface S9 and an image-side surface S10 of the fifth lens are aspheric surfaces. The sixth lens E6 has a negative refractive power, and an object-side surface S11 and an image-side surface S12 of the sixth lens are aspheric surfaces. Alternatively, the imaging lens assembly may further include an optical filter E7 having an object-side surface S13 and an image-side surface S14. In the imaging lens assembly of this embodiment, a diaphragm STO for limiting light beams may also be arranged, for example, between the object side and the first lens E1, to improve the image quality. Alternatively, the imaging lens assembly may further include a vignetting diaphragm ST1 arranged between the second lens E2 and the third lens E3. Light from an object sequentially passes through the surfaces S1 to S14 and finally forms an image on an image plane S15.

Table 19 shows the surface type, the radius of curvature, the thickness, the material and the conic coefficient of each lens of the imaging lens assembly in embodiment 7. The radius of curvature and the thickness are shown in millimeters (mm). Table 20 shows the high-order coefficients of the aspheric mirror surfaces in embodiment 7. Table 21 shows the effective focal lengths f1-f6 of the lenses, the total effective focal length f of the imaging lens assembly, and the half of the maximal field-of-view HFOV of the imaging lens assembly in embodiment 7. A surface type of each aspheric surface may be defined by the formula (1) provided in embodiment 1.

TABLE 19

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4181 | | | |
| S1 | aspheric | 1.2376 | 0.6575 | 1.55 | 56.1 | −6.2510 |
| S2 | aspheric | 5.4074 | 0.1688 | | | −15.0770 |
| S3 | aspheric | 10.2876 | 0.2200 | 1.67 | 20.4 | 99.0000 |
| S4 | aspheric | 2.5282 | 0.2814 | | | 2.0904 |
| ST1 | spherical | infinite | 0.0907 | | | 0.0000 |
| S5 | aspheric | 24.9043 | 0.2600 | 1.55 | 56.1 | 56.2251 |
| S6 | aspheric | 34.8772 | 0.6813 | | | −92.0265 |
| S7 | aspheric | −26.4672 | 0.6040 | 1.64 | 23.5 | 99.0000 |
| S8 | aspheric | −3.6136 | 0.1177 | | | −0.3197 |
| S9 | aspheric | −1.8958 | 0.2400 | 1.55 | 56.1 | −1.2580 |
| S10 | aspheric | −3.8142 | 0.3186 | | | −46.5903 |
| S11 | aspheric | −3.3756 | 0.3300 | 1.54 | 55.9 | −4.1866 |
| S12 | aspheric | 403.0474 | 0.0915 | | | 48.5845 |
| S13 | spherical | infinite | 0.2100 | 1.52 | 64.2 | |
| S14 | spherical | infinite | 0.5485 | | | |
| S15 | spherical | infinite | | | | |

TABLE 20

| surface number | A4 | A6 | A8 | A10 | A12 |
|---|---|---|---|---|---|
| S1 | 4.1729E−01 | −6.0072E−01 | 1.2598E+00 | −1.9951E+00 | 1.8297E+00 |
| S2 | −5.9902E−02 | 2.7269E−01 | −1.2241E+00 | 4.6967E+00 | −1.1055E+01 |
| S3 | −1.2327E−01 | 3.6564E−01 | 1.4514E−01 | −1.3256E+00 | −1.5091E+00 |
| S4 | −6.3501E−02 | 1.0513E+00 | −7.1243E+00 | 5.5550E+01 | −2.8161E+02 |
| S5 | −1.8212E−01 | 1.1209E−01 | 1.0767E+00 | −6.0259E+00 | 2.2437E+01 |
| S6 | −1.6491E−01 | 3.2630E−01 | −1.1371E+00 | 5.3115E+00 | −1.5665E+01 |
| S7 | −2.8536E−02 | −2.9795E−01 | 7.7049E−01 | −1.2222E+00 | 1.2517E+00 |
| S8 | 2.6581E−01 | −1.0126E+00 | 1.6092E+00 | −1.4657E+00 | 7.8021E−01 |
| S9 | 5.0875E−01 | −1.4418E+00 | 2.1597E+00 | −1.9236E+00 | 1.0235E+00 |
| S10 | 6.9947E−02 | −3.3203E−03 | −1.4995E+00 | 1.8680E−01 | −1.1864E−01 |
| S11 | −1.2007E−01 | 5.2665E−01 | −8.9675E−01 | 7.8275E−01 | −4.0383E−01 |
| S12 | −1.2881E−01 | 2.6322E−01 | −3.4318E−01 | 2.4060E−01 | −9.9945E−02 |

| surface number | A14 | A16 | A18 | A20 |
|---|---|---|---|---|
| S1 | −7.6431E−03 | −1.8445E+00 | 1.7291E+00 | −5.2854E−01 |
| S2 | 1.5439E+01 | −1.2025E+01 | 4.3081E+00 | −3.3573E−01 |
| S3 | 1.8089E+01 | −4.4707E+01 | 4.9102E+01 | −2.0910E+01 |

TABLE 20-continued

| | | | | |
|---|---|---|---|---|
| S4 | 9.0313E+02 | −1.7730E+03 | 1.9480E+03 | −9.1798E+02 |
| S5 | −5.2286E+01 | 7.2002E+01 | −5.3637E+01 | 1.6693E+01 |
| S6 | 2.9740E+01 | −3.5340E+01 | 2.3594E+01 | −6.6960E+00 |
| S7 | −7.9618E−01 | 3.0536E−01 | −6.5222E−02 | 5.9811E−03 |
| S8 | −2.3387E−01 | 3.5044E−02 | −1.5781E−03 | −9.4154E−05 |
| S9 | −3.1535E−01 | 5.0679E−02 | −2.8755E−03 | −9.2520E−05 |
| S10 | 4.4650E−02 | −9.9410E−03 | 1.2043E−03 | −6.1007E−05 |
| S11 | 1.2778E−01 | −2.4347E−02 | 2.5658E−03 | −1.1500E−04 |
| S12 | 2.5624E−02 | −4.0092E−03 | 3.5262E−04 | −1.3391E−05 |

TABLE 21

| parameter | f1(mm) | f2(mm) | f3(mm) | f4(mm) | f5(mm) | f6(mm) | f(mm) | HFOV(°) |
|---|---|---|---|---|---|---|---|---|
| numerical value | 2.78 | −5.09 | 158.08 | 6.44 | −7.22 | −6.24 | 5.06 | 32.7 |

Figures 14A, 14B:
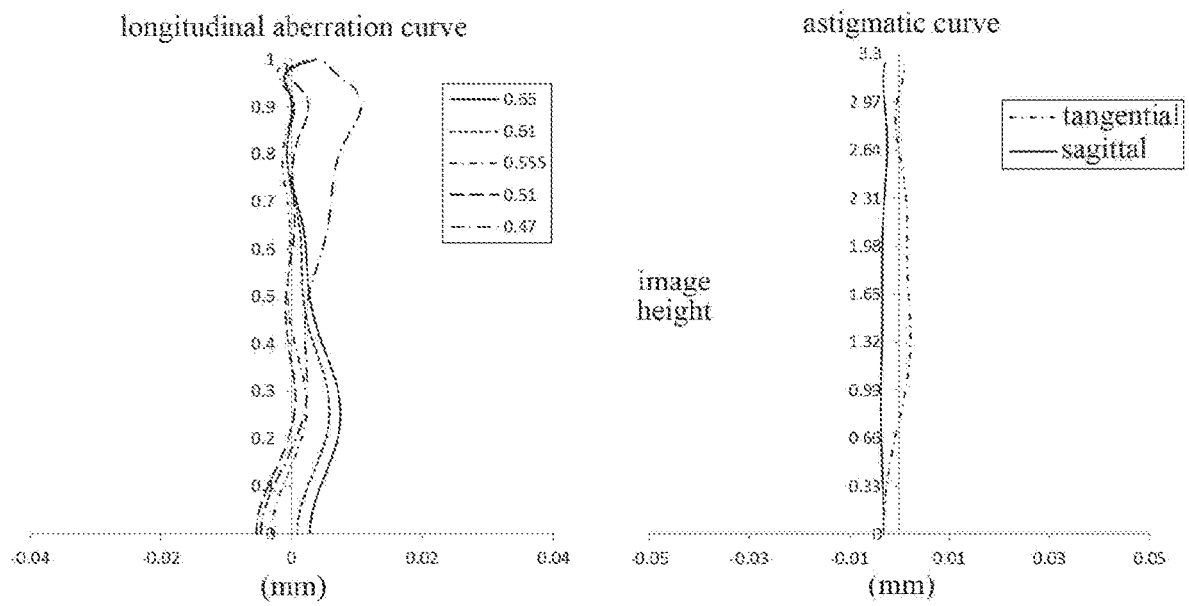

FIG. 14A illustrates a longitudinal aberration curve of the imaging lens assembly according to embodiment 7, representing deviations of focal points of light of different wavelengths converged after passing through the imaging lens assembly. FIG. 14B illustrates an astigmatic curve of the imaging lens assembly according to embodiment 7, representing a curvature of a tangential image plane and a curvature of a sagittal image plane. FIG. 14C illustrates a distortion curve of the imaging lens assembly according to embodiment 7, representing amounts of distortion at different viewing angles. FIG. 14D illustrates a lateral color curve of the imaging lens assembly according to embodiment 7, representing deviations of different image heights on an image plane after light passes through the imaging lens assembly. It can be known according to FIGS. 14A-14D that the imaging lens assembly provided in embodiment 7 can achieve a good image quality.

Embodiment 8

An imaging lens assembly according to embodiment 8 of the present disclosure is described below with reference to FIGS. 15-16D. FIG. 15 illustrates a schematic structural diagram of the imaging lens assembly according to embodiment 8 of the present disclosure.

As shown in FIG. 15, the imaging lens assembly includes, along an optical axis, six lenses E1-E6 arranged in sequence from an object side to an image side. The first lens E1 has a positive refractive power, and an object-side surface S1 and an image-side surface S2 of the first lens are aspheric surfaces. The second lens E2 has a negative refractive power, and an object-side surface S3 and an image-side surface S4 of the second lens are aspheric surfaces. The third lens E3 has a positive refractive power, and an object-side surface S5 and an image-side surface S6 of the third lens are aspheric surfaces. The fourth lens E4 has a positive refractive power, and an object-side surface S7 and an image-side surface S8 of the fourth lens are aspheric surfaces. The fifth lens E5 has a negative refractive power, and an object-side surface S9 and an image-side surface S10 of the fifth lens are aspheric surfaces. The sixth lens E6 has a negative refractive power, and an object-side surface S11 and an image-side surface S12 of the sixth lens are aspheric surfaces. Alternatively, the imaging lens assembly may further include an optical filter E7 having an object-side surface S13 and an image-side surface S14. In the imaging lens assembly of this embodiment, a diaphragm STO for limiting light beams may also be arranged, for example, between the object side and the first lens E1, to improve the image quality. Alternatively, the imaging lens assembly may further include a vignetting diaphragm ST1 arranged between the second lens E2 and the third lens E3. Light from an object sequentially passes through the surfaces S1 to S14 and finally forms an image on an image plane S15.

Table 22 shows the surface type, the radius of curvature, the thickness, the material and the conic coefficient of each lens of the imaging lens assembly in embodiment 8. The radius of curvature and the thickness are shown in millimeters (mm). Table 23 shows the high-order coefficients of the aspheric mirror surfaces in embodiment 8. Table 24 shows the effective focal lengths f1-f6 of the lenses, the total effective focal length f of the imaging lens assembly, and the half of the maximal field-of-view HFOV of the imaging lens assembly in embodiment 8. A surface type of each aspheric surface may be defined by the formula (1) provided in embodiment 1

TABLE 22

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.4237 | | | |
| S1 | aspheric | 1.2380 | 0.6574 | 1.55 | 56.1 | −6.2543 |
| S2 | aspheric | 5.4104 | 0.1687 | | | −15.2666 |
| S3 | aspheric | 10.3241 | 0.2200 | 1.67 | 20.4 | 99.0000 |
| S4 | aspheric | 2.5335 | 0.2809 | | | 2.0354 |
| ST1 | spherical | infinite | 0.0902 | | | |
| S5 | aspheric | 24.2303 | 0.2600 | 1.55 | 56.1 | 53.1635 |

TABLE 22-continued

| surface number | surface type | radius of curvature | thickness | material refractive index | abbe number | conic coefficient |
|---|---|---|---|---|---|---|
| S6 | aspheric | 33.0155 | 0.6836 | | | −92.0267 |
| S7 | aspheric | −26.2689 | 0.6044 | 1.64 | 23.5 | 99.0000 |
| S8 | aspheric | −3.6074 | 0.1177 | | | −0.5739 |
| S9 | aspheric | −1.9051 | 0.2400 | 1.55 | 56.1 | −1.2418 |
| S10 | aspheric | −3.8015 | 0.3172 | | | −46.5903 |
| S11 | aspheric | −3.3248 | 0.3300 | 1.54 | 55.9 | −4.2624 |
| S12 | aspheric | 403.6178 | 0.0915 | | | 48.5856 |
| S13 | spherical | infinite | 0.2100 | 1.52 | 64.2 | |
| S14 | spherical | infinite | 0.5485 | | | |
| S15 | spherical | infinite | | | | |

TABLE 23

| surface number | A4 | A6 | A8 | A10 | A12 |
|---|---|---|---|---|---|
| S1 | 4.1717E−01 | −6.0067E−01 | 1.2599E+00 | −1.9951E+00 | 1.8296E+00 |
| S2 | −5.9655E−02 | 2.7232E−01 | −1.2239E+00 | 4.6969E+00 | −1.1055E+01 |
| S3 | −1.2353E−01 | 3.6574E−01 | 1.4590E−01 | −1.3252E+00 | −1.5091E+00 |
| S4 | −6.3821E−02 | 1.0515E+00 | −7.1235E+00 | 5.5551E+01 | −2.8161E+02 |
| S5 | −1.8209E−01 | 1.1182E−01 | 1.0745E+00 | −6.0220E+00 | 2.2437E+01 |
| S6 | −1.6379E−01 | 3.1747E−01 | −1.0578E+00 | 4.8708E+00 | −1.4195E+01 |
| S7 | −2.7408E−02 | −2.9761E−01 | 7.6890E−01 | −1.2213E+00 | 1.2513E+00 |
| S8 | 2.6276E−01 | −9.8409E−01 | 1.5378E+00 | −1.3784E+00 | 7.1957E−01 |
| S9 | 4.9769E−01 | −1.3721E+00 | 1.9959E+00 | −1.7227E+00 | 8.7954E−01 |
| S10 | 6.3602E−02 | 1.8188E−02 | −1.8516E−01 | 2.1909E−01 | −1.3645E−01 |
| S11 | −1.1784E−01 | 5.1569E−01 | −8.7572E−01 | 7.6184E−01 | −3.9164E−01 |
| S12 | −1.2752E−01 | 2.6005E−01 | −3.4008E−01 | 2.3942E−01 | −9.9926E−02 |

| surface number | A14 | A16 | A18 | A20 |
|---|---|---|---|---|
| S1 | −7.7028E−03 | −1.8443E+00 | 1.7291E+00 | −5.2854E−01 |
| S2 | 1.5439E+01 | −1.2025E+01 | 4.3081E+00 | −3.3573E−01 |
| S3 | 1.8089E+01 | −4.4707E+01 | 4.9102E+01 | −2.0910E+01 |
| S4 | 9.0313E+02 | −1.7730E+03 | 1.9480E+03 | −9.1798E+02 |
| S5 | −5.2286E+01 | 7.2002E+01 | −5.3637E+01 | 1.6693E+01 |
| S6 | 2.6716E+01 | −3.1583E+01 | 2.1015E+01 | −5.9458E+00 |
| S7 | −7.9572E−01 | 3.0494E−01 | −6.5033E−02 | 5.9492E−03 |
| S8 | −2.0894E−01 | 2.9089E−02 | −8.1963E−04 | −1.3367E−04 |
| S9 | −2.5303E−01 | 3.4679E−02 | −6.4198E−04 | −2.2244E−04 |
| S10 | 5.0673E−02 | −1.1161E−02 | 1.3400E−03 | −6.7380E−05 |
| S11 | 1.2349E−01 | −2.3455E−02 | 2.4649E−03 | −1.1022E−04 |
| S12 | 2.5752E−02 | −4.0507E−03 | 3.5801E−04 | −1.3649E−05 |

TABLE 24

| parameter | f1(mm) | f2(mm) | f3(mm) | f4(mm) | f5(mm) | f6(mm) | f(mm) | HFOV(°) |
|---|---|---|---|---|---|---|---|---|
| numerical value | 2.79 | −5.10 | 165.07 | 6.43 | −7.32 | −6.14 | 5.06 | 32.7 |

Figure 16A:
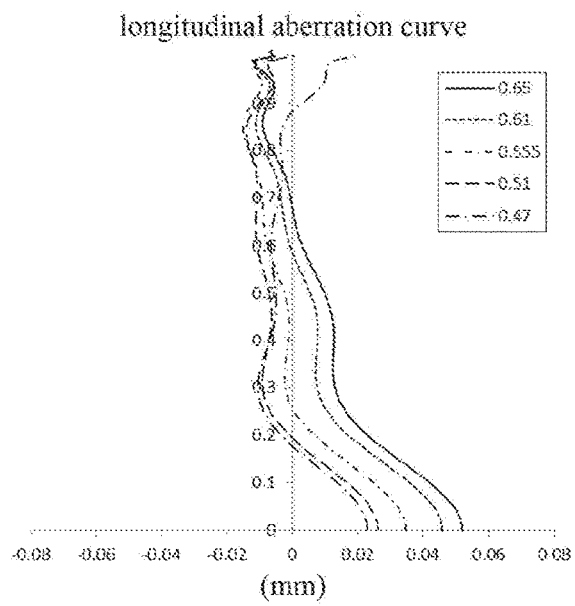
FIGS. 16A-16D respectively illustrate a longitudinal aberration curve, an astigmatic curve, a distortion curve and a lateral color curve of the imaging lens assembly according to embodiment 8.
Figure 16B:
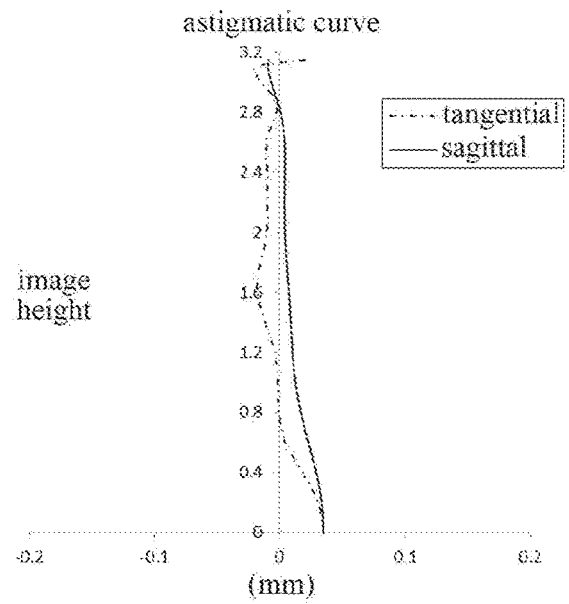
Figure 16C:
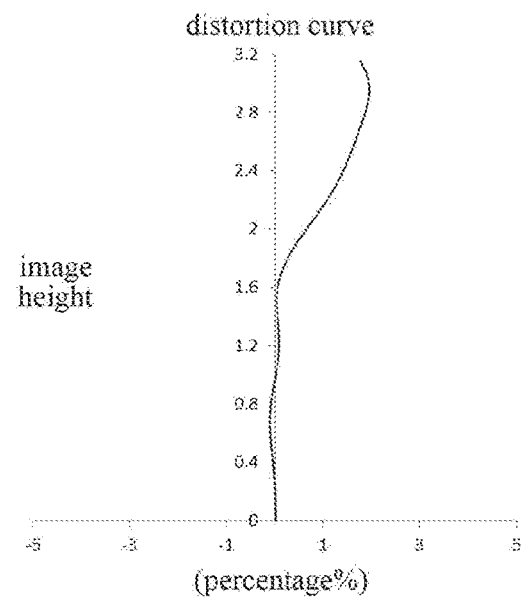
Figure 16D:
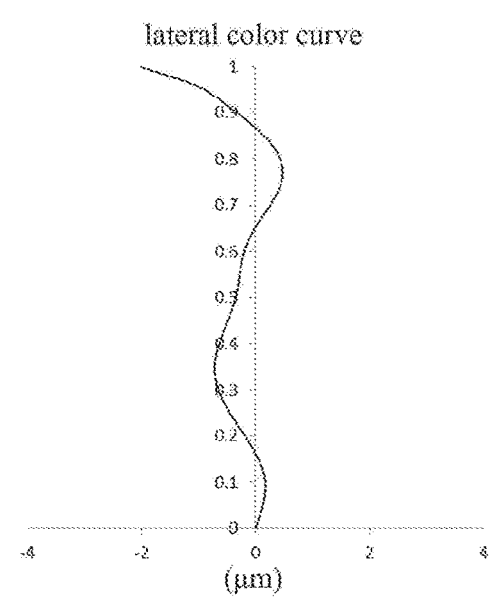

FIG. 16A illustrates a longitudinal aberration curve of the imaging lens assembly according to embodiment 8, representing deviations of focal points of light of different wavelengths converged after passing through the imaging lens assembly. FIG. 16B illustrates an astigmatic curve of the imaging lens assembly according to embodiment 8, representing a curvature of a tangential image plane and a curvature of a sagittal image plane. FIG. 16C illustrates a distortion curve of the imaging lens assembly according to embodiment 8, representing amounts of distortion at different viewing angles. FIG. 16D illustrates a lateral color curve of the imaging lens assembly according to embodiment 8, representing deviations of different image heights on an image plane after light passes through the imaging lens assembly. It can be known according to FIGS. 16A-16D that the imaging lens assembly provided in embodiment 8 can achieve a good image quality.

To sum up, embodiment 1 to embodiment 8 respectively satisfy the relations shown in Table 25 below.

TABLE 25

| Conditional formula | Embodiment | | | | | | | |
|---|---|---|---|---|---|---|---|---|
| | 1 | 2 | 3 | 4 | 5 | 6 | 7 | 8 |
| TTL/ImgH | 1.88 | 1.55 | 1.99 | 2.00 | 1.49 | 1.48 | 1.53 | 1.53 |
| f/CT6 | 15.27 | 30.41 | 21.37 | 17.86 | 15.35 | 21.90 | 15.34 | 15.34 |
| f4/f3 | 0.01 | 0.36 | 0.16 | 0.05 | 0.06 | 0.37 | 0.04 | 0.04 |
| CT6/ET6 | 1.05 | 0.34 | 1.06 | 1.21 | 0.82 | 0.49 | 0.42 | 0.42 |
| TTL/f | 0.96 | 1.05 | 0.92 | 0.93 | 0.95 | 1.05 | 0.95 | 0.95 |
| CT4/f | 0.11 | 0.10 | 0.04 | 0.09 | 0.14 | 0.09 | 0.12 | 0.12 |
| T34/f | 0.13 | 0.13 | 0.05 | 0.14 | 0.14 | 0.14 | 0.13 | 0.14 |
| R1/f | 0.24 | 0.32 | 0.25 | 0.24 | 0.25 | 0.32 | 0.24 | 0.24 |
| |R1/R2| | 0.26 | 0.13 | 0.02 | 0.06 | 0.22 | 0.12 | 0.23 | 0.23 |
| f/f6 | −0.87 | −1.59 | −0.85 | 0.12 | −1.03 | −1.63 | −0.81 | −0.82 |
| f/EPD | 2.64 | 2.62 | 2.69 | 2.63 | 2.69 | 2.47 | 2.69 | 2.69 |
| f/f5 | −0.56 | 0.50 | 0.75 | −1.61 | −0.52 | 0.53 | −0.70 | −0.69 |
| f/R10 | −1.43 | −0.99 | −1.20 | −0.63 | −1.65 | −0.96 | −1.33 | −1.33 |

The present disclosure further provides an imaging device, having an electronic photosensitive element which may be a photosensitive charge-coupled device (CCD) or a complementary metal-oxide semiconductor (CMOS) element. The imaging device may be an independent imaging device such as a digital camera, or may be an imaging module integrated in a mobile electronic device such as a mobile phone. The imaging device is equipped with the imaging lens assembly described above.

The foregoing descriptions are merely illustrations for the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, for example, technical solutions formed by replacing the above features as disclosed in the present disclosure with (but not limited to) technical features having similar functions.

What is claimed is:

1. An imaging lens assembly, comprising sequentially a first lens, a second lens, a third lens, a fourth lens, a fifth lens and a sixth lens from an object side to an image side along an optical axis, and having a total effective focal length f,
    wherein the first lens has a positive refractive power, and an object-side surface of the first lens is a convex surface;
    the second lens has a negative refractive power;
    the third lens, the fourth lens, the fifth lens and the sixth lens each have a positive refractive power or a negative refractive power; and
    a distance TTL from the object-side surface of the first lens to an image plane of the imaging lens assembly on the optical axis and the total effective focal length f satisfy: TTL/f≤1.05,
    wherein the total effective focal length f and a center thickness CT6 of the sixth lens on the optical axis satisfy: f/CT6≥15.

2. The imaging lens assembly according to claim 1, wherein the distance TTL from the object-side surface of the first lens to the image plane of the imaging lens assembly on the optical axis and ImgH, ImgH being half of a diagonal length of an effective pixel area on the image plane of the imaging lens assembly, satisfy: TTL/ImgH≤2.0.

3. The imaging lens assembly according to claim 1, having an entrance pupil diameter EPD, wherein the total effective focal length f and the entrance pupil diameter EPD satisfy: f/EPD≤2.7.

4. The imaging lens assembly according to claim 1, wherein the center thickness CT6 of the sixth lens on the optical axis and an edge thickness ET6 of the sixth lens at a maximum radius satisfy: CT6/ET6<1.3.

5. The imaging lens assembly according to claim 1, wherein a center thickness CT4 of the fourth lens on the optical axis and the total effective focal length f satisfy: 0<CT4/f<0.5.

6. The imaging lens assembly according to claim 1, wherein an air spacing T34 between the third lens and the fourth lens on the optical axis and the total effective focal length f satisfy: 0<T34/f<0.2.

7. The imaging lens assembly according to claim 1, wherein an effective focal length f4 of the fourth lens and an effective focal length f3 of the third lens satisfy: 0<f4/f3<0.5.

8. The imaging lens assembly according to claim 1, wherein the total effective focal length f and an effective focal length f6 of the sixth lens satisfy: −2.0<f/f6<0.5.

9. The imaging lens assembly according to claim 1, wherein a radius of curvature R1 of the object-side surface of the first lens and the total effective focal length f satisfy: 0<R1/f<0.5.

10. The imaging lens assembly according to claim 1, wherein a radius of curvature R1 of the object-side surface of the first lens and a radius of curvature R2 of an image-side surface of the first lens satisfy: |R1/R2|<0.5.

11. An imaging lens assembly, comprising sequentially a first lens, a second lens, a third lens, a fourth lens, a fifth lens and a sixth lens from an object side to an image side along an optical axis, and having a total effective focal length f,
    wherein the first lens has a positive refractive power, and an object-side surface of the first lens is a convex surface;
    the second lens has a negative refractive power;
    the third lens, the fourth lens, the fifth lens and the sixth lens each have a positive refractive power or a negative refractive power; and
    the total effective focal length f and an effective focal length of the fifth lens f5 satisfy: −2.0<f/f5<1.0,
    wherein the total effective focal length f and a center thickness CT6 of the sixth lens on the optical axis satisfy: f/CT6≥15.

12. The imaging lens assembly according to claim 11, wherein a radius of curvature R1 of the object-side surface of the first lens and the total effective focal length f satisfy: 0<R1/f<0.5.

13. The imaging lens assembly according to claim 11, wherein a radius of curvature R1 of the object-side surface of the first lens and a radius of curvature R2 of an image-side surface of the first lens satisfy: |R1/R2|<0.5.

14. The imaging lens assembly according to claim 11, wherein an effective focal length f4 of the fourth lens and an effective focal length f3 of the third lens satisfy: 0<f4/f3<0.5.

15. The imaging lens assembly according to claim 11, wherein an air spacing T34 between the third lens and the fourth lens on the optical axis and the total effective focal length f satisfy: 0<T34/f<0.2.

16. The imaging lens assembly according to claim 11, wherein a center thickness CT4 of the fourth lens on the optical axis and the total effective focal length f satisfy: 0<CT4/f<0.5.

17. The imaging lens assembly according to claim 11, having an entrance pupil diameter EPD, wherein the total effective focal length f and the entrance pupil diameter EPD satisfy: f/EPD≤2.7.

18. The imaging lens assembly according to claim 11, wherein a distance TTL from the object-side surface of the first lens to an image plane of the imaging lens assembly on the optical axis and ImgH, ImgH being half of a diagonal length of an effective pixel area on the image plane of the imaging lens assembly, satisfy: TTL/ImgH≤2.0.

19. An imaging lens assembly, comprising sequentially a first lens, a second lens, a third lens, a fourth lens, a fifth lens and a sixth lens from an object side to an image side along an optical axis, and having a total effective focal length f,
   wherein the first lens has a positive refractive power, and an object-side surface of the first lens is a convex surface;
   the second lens has a negative refractive power;
   the third lens, the fourth lens, the fifth lens and the sixth lens each have a positive refractive power or a negative refractive power; and
   the total effective focal length f and a radius of curvature R10 of an image-side surface of the fifth lens satisfy: −2.0<f/R10<0,
   wherein the total effective focal length f and a center thickness CT6 of the sixth lens on the optical axis satisfy: f/CT6≥15.

* * * * *